US008867881B2

(12) United States Patent
Hayashi

(10) Patent No.: US 8,867,881 B2
(45) Date of Patent: *Oct. 21, 2014

(54) MULTICORE OPTICAL FIBER

(71) Applicant: Sumitomo Electric Industries, Ltd., Osaka (JP)

(72) Inventor: Tetsuya Hayashi, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/252,432

(22) Filed: Apr. 14, 2014

(65) Prior Publication Data

US 2014/0226942 A1 Aug. 14, 2014

Related U.S. Application Data

(63) Continuation of application No. 13/416,264, filed on Mar. 9, 2012, now Pat. No. 8,718,429, which is a continuation of application No. PCT/JP2011/069481, filed on Aug. 29, 2011.

(30) Foreign Application Priority Data

Aug. 30, 2010 (JP) ................................ 2010-192724
Feb. 25, 2011 (WO) .................. PCT/JP2011/054389

(51) Int. Cl.
*G02B 6/036* (2006.01)
*G02B 6/02* (2006.01)

(52) U.S. Cl.
CPC ........ *G02B 6/02042* (2013.01); *G02B 6/02014* (2013.01)
USPC ....................................................... 385/126

(58) Field of Classification Search
None
See application file for complete search history.

(56) References Cited

U.S. PATENT DOCUMENTS

| 5,703,987 | A | 12/1997 | Imoto |
| 8,285,094 | B2 | 10/2012 | Takenaga et al. |
| 2002/0176677 | A1 | 11/2002 | Kumar et al. |
| 2010/0290750 | A1 | 11/2010 | Imamura |
| 2011/0235983 | A1 | 9/2011 | Hayashi et al. |
| 2011/0274398 | A1 | 11/2011 | Fini et al. |

(Continued)

FOREIGN PATENT DOCUMENTS

| CN | 101551487 A | 10/2009 |
| JP | 58-13504 | 7/1981 |
| JP | 9-230156 | 9/1997 |
| JP | 2010-152163 | 7/2010 |

OTHER PUBLICATIONS

Shigeichi Moriguchi et al., "Iwanami Suugaku Kousiki (Mathematical Formulae) II," Iwanami Shoten, 1987, p. 154.

(Continued)

*Primary Examiner* — Hemang Sanghavi
(74) *Attorney, Agent, or Firm* — Drinker Biddle & Reath LLP

(57) ABSTRACT

The present invention relates to a multicore optical fiber having a structure for suppressing core-to-core crosstalk. The multicore optical fiber (100A) comprises a plurality of cores extending along a predetermined axis while being arranged like a hexagonal lattice on a cross section perpendicular to the axis and a cladding region (120) integrally surrounding the plurality of cores. All of core portions, each constituting at least a part of the associated one of the plurality of cores, have substantially the same structure.

8 Claims, 19 Drawing Sheets

(56) References Cited

U.S. PATENT DOCUMENTS

2013/0039627 A1     2/2013   Li et al.
2014/0003807 A1*   1/2014   Hamaguchi et al. ............ 398/29
2014/0119694 A1*   5/2014   Abedin et al. .................. 385/43

OTHER PUBLICATIONS

Shigeichi Moriguchi et al., "Iwanami Suugaku Kousiki (Mathematical Formulae) III," Iwanami Shoten, 1987, p. 72.

Masanori Koshiba et al., "Heterogeneous multi-core fibers: proposal and design principle," IEICE Electronics Express, 2009, pp. 98-103, vol. 6, No. 2.

K. Takenaga et al., "Evaluation of High Power Endurance of Bend-Insensitive Fibers," Proceedings of IEICE General Conference, Tsushin 2, The Institute of Electronics, Information and Communication Engineers, Mar. 5, 2008, p. 306, B-10-23.

Kunimasa Saitoh et al., "Multi-Core Hole-Assisted Fibers for High Core Density SDM," Proceedings of the IEICE General Conference, Tsushin 2, The Institute of Electronics, Information and Communication Engineers, Mar. 2, 2010, p. 523, B-13-28 [related to "Multi-Core Hole-Assisted Fibers for High Core Density Space Division Multiplexing"].

Kunimasa Saitoh et al., "Multi-Core Hole-Assisted Fibers for High Core Density Space Division Multiplexing," $15^{th}$ OptoElectronics and Communications Conference (OECC2010), Technical Digest, paper 7C2-1, Jul. 2010, pp. 164-165.

Y. Arakawa et al., "Reduction of Crosstalk by Quasi-Homogeneous Solid Multi-Core Fiber," Porceedings of the IEICE General Conference, Tsushin 2, The Institute of Electronics, Information and Communication Engineers, Mar. 2, 2010, p. 357, B-10-19 [related to "Reduction of Crosstalk by Quasi-Hemogeneous Solid Multi-Core Fiber," OFC/NFOEC 2010 paper OWK7].

K. Takenaga et al., "Reduction of Crosstalk by Quasi-Homogeneous Solid Multi-Core Fiber," OFC/NFOEC 2010 paper OWK7.

U.S. Office Action dated Dec. 14, 2012 that issued in U.S. Appl. No. 13/034,347 including Double Patenting Rejection on pp. 2-3.

* cited by examiner (a)

(b)

(a)

(b)

(a)

(b)

| R [mm]<br>r [μm] | 140 | 60 | 30 | 10 |
|---|---|---|---|---|
| -60 | -0.043 | -0.100 | -0.201 | -0.605 |
| -50 | -0.036 | -0.083 | -0.167 | -0.504 |
| -40 | -0.029 | -0.067 | -0.134 | -0.402 |
| -30 | -0.021 | -0.050 | -0.100 | -0.301 |
| -20 | -0.014 | -0.033 | -0.067 | -0.201 |
| -10 | -0.007 | -0.017 | -0.033 | -0.100 |
| 0 | 0 | 0 | 0 | 0 |
| 10 | 0.007 | 0.017 | 0.033 | 0.100 |
| 20 | 0.014 | 0.033 | 0.067 | 0.199 |
| 30 | 0.021 | 0.050 | 0.100 | 0.299 |
| 40 | 0.029 | 0.067 | 0.133 | 0.398 |
| 50 | 0.036 | 0.083 | 0.166 | 0.496 |
| 60 | 0.043 | 0.100 | 0.199 | 0.595 |

(a)

(b)

(a)

(b)

(a)

(b)

(c)

(d)

(e)

(f)

(a)

(b)

(c)

(d)

(e)

(f)

(a)

(b)

(c)

(d)

(e)

(f)

MULTICORE OPTICAL FIBER

CROSS REFERENCE TO RELATED APPLICATIONS

This is a Continuation Application of co-pending application Ser. No. 13/416,264, having a filing date of Mar. 9, 2012, which is a Continuation Application of International Application No. PCT/JP2011/069481 filed Aug. 29, 2011, which claims benefit of Japanese Application No. 2010-192724 filed Aug. 30, 2010 and International Application No. PCT/JP2011/054389 filed Feb. 25, 2011, which are herein incorporated by reference in their entireties.

TECHNICAL FIELD

The present invention relates to a multicore optical fiber having a plurality of cores extending along a predetermined axis.

BACKGROUND ART

For attaining larger capacity in optical transmissions, multicore fibers constructed such as to surround a plurality of cores integrally with a cladding region have been known.

For example, the multicore fiber disclosed in Non-Patent Document 1 can attain low crosstalk when the center-to-center distance of cores is 30 m, since the power transfer ratio between cores adjacent to each other can be made sufficiently low if the relative refractive index difference $\Delta$ of cores with respect to the cladding (hereinafter referred to as core $\Delta$) is changed slightly (e.g., by 0.05%) between the adjacent cores. This is said to be able to achieve a multicore optical fiber having a cladding diameter of 125 μm and including three kinds of cores with different values of core $\Delta$.

CITATION LIST

Non Patent Document

Non-Patent Document 1: IEICE Electronics Express, Vol. 6, No. 2, pp. 98-103

Non-Patent Document 2: Shigeichi MORIGUCHI, et al., "Iwanami Sugaku Koshiki (Mathematical Formulae) III," p. 154, Iwanami Shoten (1987)

Non-Patent Document 3: Shigeichi MORIGUCHI, et al., "Iwanami Sugaku Koshiki (Mathematical Formulae) II," p. 72, Iwanami Shoten (1987)

SUMMARY OF INVENTION

Technical Problem

The inventors studied conventional multicore optical fibers and, as a result, have found the following problem. That is, as mentioned above, Non-Patent Document 1 does not assume a state where the multicore fiber is bent. Therefore, crosstalk may occur greatly depending on the state of bending the multicore fiber when the difference in core $\Delta$ between the adjacent cores is on the order of 0.005%.

For solving problems such as the one mentioned above, it is an object of the present invention to provide a multicore optical fiber having a structure for suppressing the core-to-core crosstalk.

Solution to Problem

As a result of diligent studies for achieving the above-mentioned object, the inventors have found that the core-to-core crosstalk can be suppressed when design parameters of a multicore optical fiber and its radius of curvature fall within specific ranges and further when the multicore optical fiber is an optical fiber having a trench profile which falls within a specific range.

That is, the multicore optical fiber according to the present invention is a multicore optical fiber comprising a plurality of cores extending along a predetermined axis while being arranged like a hexagonal lattice on a cross section perpendicular to the axis and a cladding region surrounding each of the plurality of cores. All of core portions, each constituting at least a part of the associated one of the plurality of cores, have substantially the same structure.

Letting $\kappa$ be the mode-coupling coefficient between cores, $\beta$ be the propagation constant of each of the plurality of cores, $\Lambda$ be the core pitch, R be the radius of curvature of the fiber, $L_F$ be the fiber length, $XT_\mu$ be the average value of a crosstalk distribution after propagation, $XT_S$ be the permissible maximum $XT_\mu$, $\Lambda_{th}$ be the minimum permissible $\Lambda$, and $R_{th}$ be the permissible maximum R, the multicore optical fiber satisfies any of the following expressions (1) to (3):

$$XT_\mu = 6 \cdot 2 \frac{\kappa^2}{\beta} \frac{R}{\Lambda} L_F \leq XT_S \quad (1)$$

$$\Lambda \geq 12 \frac{\kappa^2}{\beta} R \frac{L_F}{XT_S} = \Lambda_{th} \quad (2)$$

$$R \leq \frac{1}{12} \frac{\beta}{\kappa^2} \Lambda \frac{XT_S}{L_F} = R_{th} \quad (3)$$

More specifically, each of the core portions preferably comprises a first core portion, a second core portion, and a trench layer. The first core portion has a refractive index higher than that of the cladding region. The second core portion is disposed about the first core portion and has a refractive index different from that of the first core portion. The trench layer is disposed so as to surround the second core portion and has a refractive index lower than that of the cladding region.

As a first aspect of the core portion structure mentioned above, letting a be the radius of the first core portion, Ra be the ratio of the outer diameter of the first core portion to the outer diameter of the second core portion, Rb be the ratio of the outer diameter of the second core portion to the outer diameter of the trench layer, $\Delta1$ be the relative refractive index difference of the first core portion with respect to the second core portion, $\Delta3$ be the relative refractive index difference of the trench layer with respect to the second core portion, and $\Delta4$ be the relative refractive index difference of the cladding region with respect to the second core portion, the multicore optical fiber according to the first aspect satisfies the following expressions (4) to (9):

$$4.42[\mu m] \leq a \leq 5.15[\mu m] \quad (4)$$

$$0.627 \leq Ra \leq 0.811 \quad (5)$$

$$0.470 \leq Rb \leq 0.899 \quad (6)$$

$$0.295[\%] \leq \Delta1 \leq 0.395[\%] \quad (7)$$

$$-0.529[\%] \leq \Delta3 \leq -0.173[\%] \quad (8)$$

$$-0.029[\%] \leq \Delta4 \leq 0.123[\%] \quad (9)$$

Further, letting $\Lambda$ be the core pitch, the multicore optical fiber according to the first aspect satisfies the following expressions (10) to (15):

$$a \geq 1.314 \cdot 10^1 - 1.988 \cdot 10^{-1} \Lambda [\mu m] \quad (10)$$

$$Ra \leq 4.062 \cdot 10^{-2} \Lambda - 1.007 \quad (11)$$

$$Rb \leq \frac{1}{5.254 - 7.847 \cdot 10^{-2} \Lambda} \quad (12)$$

$$\Delta 1 \geq 1.099 - 1.799 \cdot 10^{-2} \Lambda [\%] \quad (13)$$

$$\Delta 3 \leq 4.350 \cdot 10^{-2} \Lambda - 2.236 [\%] \quad (14)$$

$$\Delta 4 \leq \frac{\sqrt{2.928 \Lambda^2 - 2.108 \cdot 10^2 \Lambda + 3.808 \cdot 10^3} - 0.9439 \Lambda + 2.937 \cdot 10^1}{1.440 \Lambda - 50.74} [\%] \quad (15)$$

Preferably, the multicore optical fiber according to the first aspect has a core pitch $\Lambda$ of 40.2 μm or more and, as optical characteristics of each core portion constituting at least a part of the associated one of the plurality of cores, a cable cutoff wavelength λcc of 1530 nm or less, a mode field diameter of 9.5 to 10.5 μm at a wavelength of 1550 nm, a bending loss of 0.5 dB or less at a wavelength of 1625 nm per turn at a radius of curvature of 30 mm, and a core-to-core crosstalk of −30 dB or less at a probability of 99.99% or higher at a wavelength of 1625 nm after propagation over 100 km.

As a second aspect of the core portion structure mentioned above, letting a be the radius of the first core portion, Ra be the ratio of the outer diameter of the first core portion to the outer diameter of the second core portion, Rb be the ratio of the outer diameter of the second core portion to the outer diameter of the trench layer, $\Delta 1$ be the relative refractive index difference of the first core portion with respect to the second core portion, $\Delta 3$ be the relative refractive index difference of the trench layer with respect to the second core portion, and $\Delta 4$ be the relative refractive index difference of the cladding region with respect to the second core portion, the multicore optical fiber satisfies the following expressions (16) to (21):

$$4.01[\mu m] \leq a \leq 5.15[\mu m] \quad (16)$$

$$0.627 \leq Ra \leq 0.970 \quad (17)$$

$$0.470 \leq Rb \quad (18)$$

$$0.154[\%] \leq \Delta 1 \leq 0.395[\%] \quad (19)$$

$$-0.529[\%] \leq \Delta 3 \leq 0.0[\%] \quad (20)$$

$$-0.029[\%] \leq \Delta 4 \leq 0.123[\%] \quad (21)$$

Further, as optical characteristics of each core portion constituting at least a part of the associated one of the plurality of cores, the multicore optical fiber according to the second aspect has a cable cutoff wavelength λcc of 1530 nm or less, a mode field diameter of 8.8 to 11.2 μm at a wavelength of 1550 nm, and a bending loss of 0.5 dB or less at a wavelength of 1625 nm per turn at a radius of curvature of 30 mm.

Letting $\Lambda$ be the core pitch, $R_{th}$ [mm] be the permissible maximum radius of curvature, and $XT_S$ be the average value of the permissible maximum crosstalk distribution after propagation over the fiber length $L_F$ [km] in the multicore optical fibers according to the first and second aspects, the multicore optical fibers preferably satisfy the following expression (22):

$$\Lambda \geq \frac{\ln\left(\frac{R_{th} \cdot L_F}{XT_S}\right) + 5.5498}{0.7655} \quad (22)$$

Here, in the multicore optical fibers, the average value $XT_\mu$ of the crosstalk distribution after propagation over the fiber length $L_F$ [km] at a wavelength of 1565 nm is preferably $XT_S$ or less.

Letting $\Lambda$ be the core pitch, $R_{th}$ [mm] be the permissible maximum radius of curvature, and $XT_S$ be the average value of the permissible maximum crosstalk distribution after propagation over the fiber length $L_F$ [km] in the multicore optical fibers according to the first and second aspects, the multicore optical fibers may satisfy the following expression (23):

$$\Lambda \geq \frac{\ln\left(\frac{R_{th} \cdot L_F}{XT_S}\right) + 5.4554}{0.7229} \quad (23)$$

Here, in the multicore optical fibers, the average value $XT_\mu$ of the crosstalk distribution after propagation over the fiber length $L_F$ [km] at a wavelength of 1625 nm is preferably $XT_S$ or less.

In the multicore optical fibers according to the above-mentioned first and second aspects, the maximum radius of curvature $R_{th}$ is 81.1 mm or more, preferably 153.1 mm or more, more preferably 369.0 mm or more. The maximum radius of curvature $R_{th}$ may be 508.6 mm or more, preferably 1141.86 mm or more.

In the optical fiber cable according to the present invention, the permissible maximum value $XT_S$ as the average value of a distribution of crosstalk after light having a first wavelength propagates over the fiber length $L_F$=100 km or more is preferably 0.001. While the maximum value $XT_S$ may be 0.001 at a wavelength in use, it is preferred that at least 1565 nm and 1625 nm be assumed as the first wavelength (wavelength in use) when wavelength division multiplexing transmission is taken into consideration. The transmission distance is not limited to the fiber length $L_F$=100 km. $L_F$ may be 1000 km or more or 10000 km or more, for example, while $XT_S$ at a wavelength of 1565 nm or 1625 nm is 0.001 or less.

In the multicore optical fibers according to the first and second aspects, the core pitch $\Lambda$ may satisfy any of conditions of 28.03 μm or more, 28.86 μm or more, 29.55 μm or more, 30.01 μm or more, 30.43 μm or more, 31.49 μm or more, 31.65 μm or more, 32.09 μm or more, and 33.21 μm or more. Here, in the multicore optical fibers, the respective trench layers of the cores are not in contact with each other.

Advantageous Effects of Invention

The present invention can provide a multicore optical fiber having a structure for suppressing the core-to-core crosstalk.

REFERENCE SIGNS LIST

100 . . . optical fiber; 100A . . . multicore fiber, 110A1, 110B1 to 110B3, 110C1 to 110C3 . . . core; 111 . . . first core portion; 112 . . . second core portion; 113 . . . trench layer; 120 . . . cladding region; 130 . . . resin coating; 200 . . . sheath; 250 . . . wrap; 300 . . . optical fiber cable; and 310 . . . center member

DESCRIPTION OF EMBODIMENTS

In the following, embodiments of the multicore optical fiber according to the present invention will be explained in detail with reference to FIGS. 1 to 19. In the explanation of drawings, the same constituents will be referred to with the same signs while omitting their overlapping descriptions.

Figure 1:
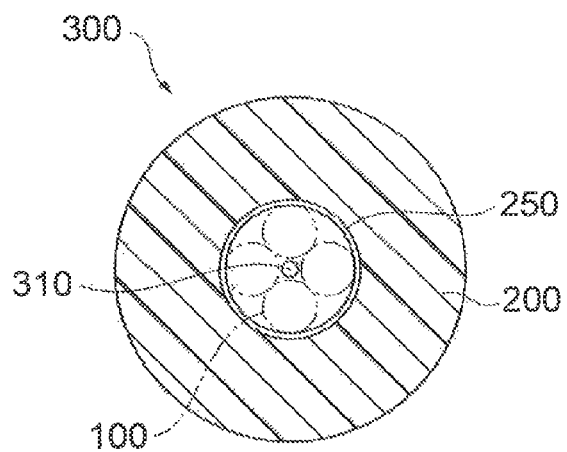
FIG. 1 is a set of sectional and perspective views showing the structure of a conventional optical fiber cable.
Figure 1:
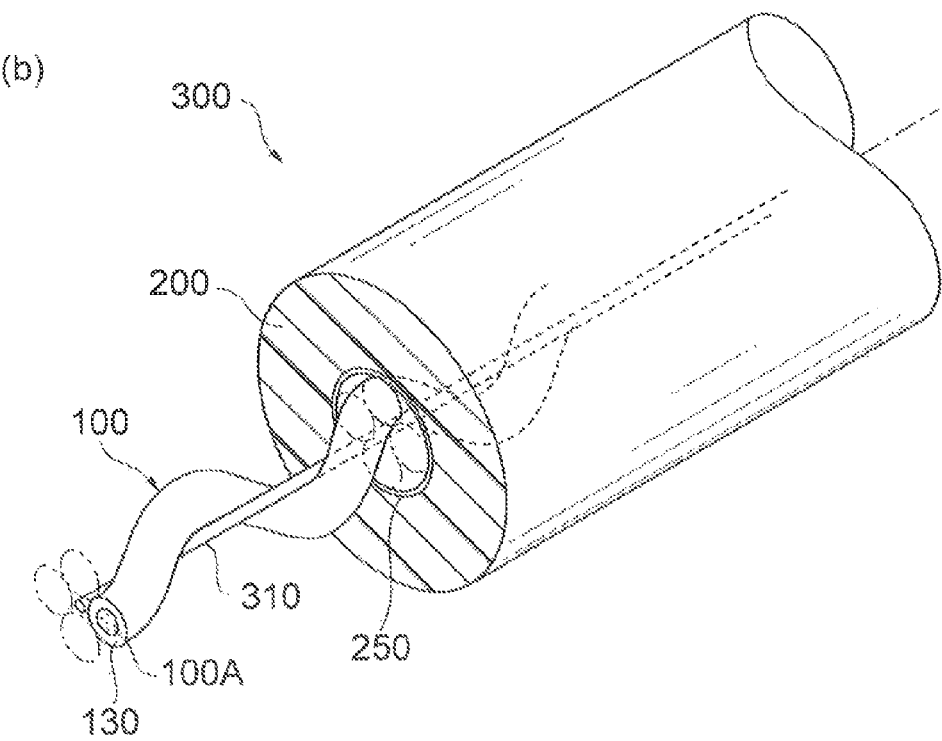
Figure 2:
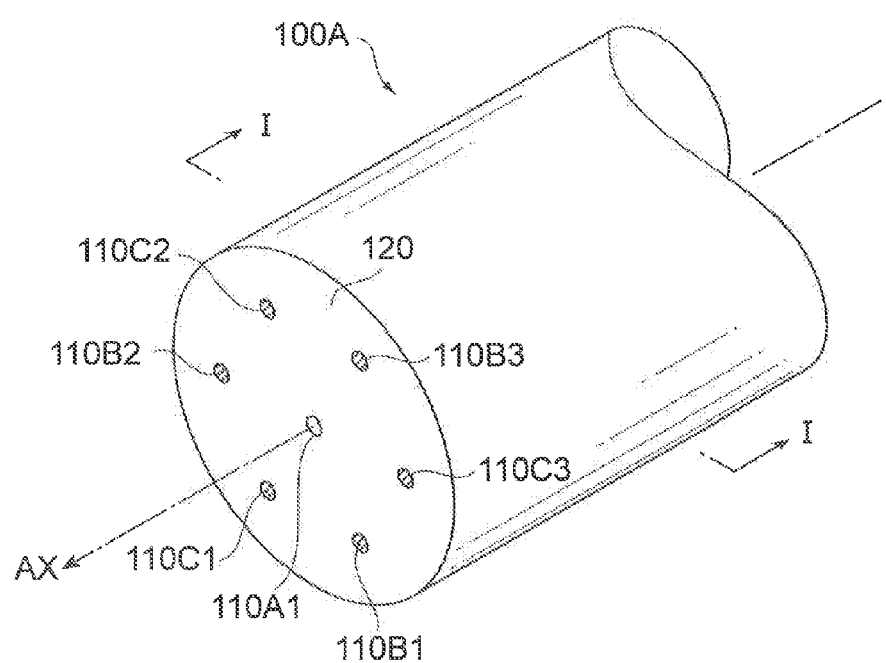
FIG. 2 is a perspective view showing a structural example of a multicore optical fiber employable in the optical fiber cable of FIG. 1.
Figure 3:
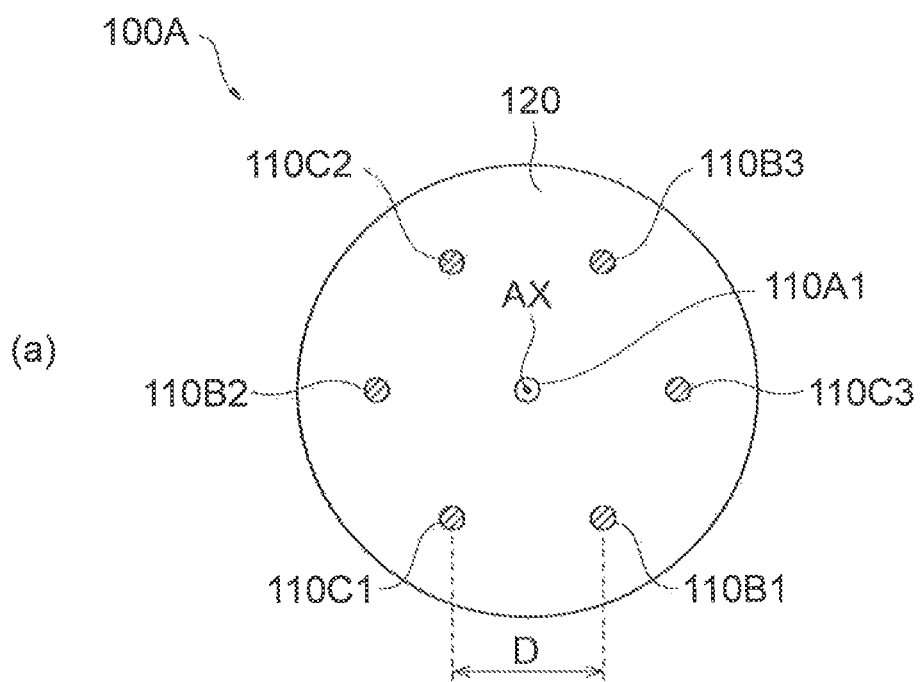
FIG. 3 is a set of diagrams showing a cross-sectional structure of the multicore optical fiber taken along the line I-I of FIG. 2 and a refractive index profile near each core.
Figure 3:
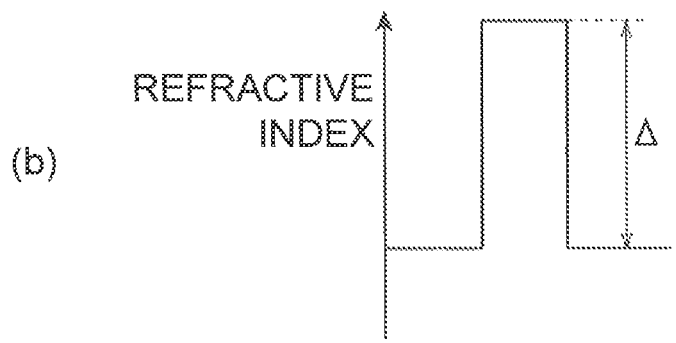

First, FIG. 1 shows the structure of a conventional optical fiber cable, in which FIGS. 1(a) and 1(b) are sectional and perspective views of the optical fiber cable, respectively, in particular. FIG. 2 is a perspective view showing a structural example of a multicore optical fiber employable in the optical fiber cable of FIG. 1, while FIG. 3 is a set of diagrams showing a cross-sectional structure of the multicore optical fiber taken along the line I-I of FIG. 2 and a refractive index profile near each core.

As shown in FIGS. 1(a) and 1(b), an optical fiber cable 300 according to the present embodiment comprises a center member 310, a plurality of optical fibers 100 twined at a predetermined pitch around the center member 310, a wrap 250 wound over the plurality of optical fibers so as to keep their twined state, and a sheath 200 surrounding the wrap 250. Each optical fiber 100 comprises a multicore fiber 100A and a resin coating 130 covering the multicore fiber 100A as a whole. Each of the plurality of optical fibers 100 is twined at a predetermined pitch along its longitudinal direction around the center member 310, so as to be bent at a fixed radius of curvature. The sheath 200 covers the wrap 250 as a whole so as to protect the optical fibers 100 against external forces. The center member 310 may be either a metal material such as a tension member or a shrinkproof material resistant to shrinkage of the sheath 200. Though FIG. 1(b) depicts only one core of the optical fibers 100 for simplification of the description, all the optical fibers 100 included in the optical fiber cable 300 are twined around the center member 310 in practice. The optical fiber cable of the present invention is not limited to the structure mentioned above; for example, fibers can be bent at a given radius of curvature or less by a slot cable in which a helical slot (groove) is formed on a surface of a cylindrical member, a ribbon fiber containing a multicore fiber is laid on the slot, and the surface of the cylindrical member is further covered with a wrap or sheath or by adjusting the pitch of the helix of the slot.

As shown in FIGS. 2 and 3(a), the multicore fiber 100A employable for the optical fiber cable 300 comprises a plurality of cores 110A1, 110B1 to 110B3, and 110C1 to 110C3 (seven cores in the example shown in FIGS. 2 and 3(a)), each extending along a predetermined axis AX, and a cladding region 120 integrally surrounding the seven cores. The multicore fiber 100A shown in FIGS. 2 and 3(a) has such a core arrangement that the core 110A1 is placed at the center of a cross section (surface orthogonal to the predetermined axis AX) while the cores 110B1 to 110B3 and 110C1 to 110C3 are arranged with a center-to-center distance (core interval) of D therebetween.

Preferably, the cores 110A1, 110B1 to 110B3, and 110C1 to 110C3 have the same refractive index profile structure. Specifically, FIG. 3(b) shows a schematic example of the refractive index profile of each core in FIG. 3(a). In the example shown in FIG. 3(b), the refractive index profile near each of the cores 110A1, 110B1 to 110B3, and 110C1 to 110C3 is a refractive index profile of a step index type (in which each core has a relative refractive index difference Δ with respect to the cladding region 120).

A method of setting the effective refractive index of each core in the multicore fiber 100A will now be explained.

The power transfer ratio F between two cores is represented by the following expression (24):

$$F = \frac{1}{1 + \left(\frac{\psi}{\kappa}\right)^2} \qquad (24)$$

$$\psi = (\beta_1 - \beta_2)/2$$

where κ is the coupling coefficient between cores, and $\beta_n$ is the propagation constant of a core n.

The coupling length L (a distance at which, when light is incident on one core n, the power of the other core m is maximized) is represented by the following expression (25):

$$L = \frac{\pi}{2\sqrt{\kappa^2 + \psi^2}} \qquad (25)$$

Here, while crosstalk can be lowered by reducing F or increasing L according to the above-mentioned Non-Patent Document 1, it is difficult for a multicore fiber employing a typical core having a cladding diameter of 125 μm and a core Δ of 0.4% to sufficiently increase L alone while keeping F large and accommodate a number of cores within a cladding.

Therefore, it is necessary for F to be made smaller. For reducing F, it is necessary for ϕ to become greater, i.e., the difference in propagation coefficient between cores or, in other words, the difference in effective refractive index between cores must be made greater. The above-mentioned Non-Patent Document 1 studies this point with simulations. In accordance with the study, crosstalk can sufficiently be reduced when the cores adjacent to each other have a core interval D of 30 μm or greater while the core Δ varies by 0.005% between the adjacent cores. Hence, the above-mentioned Non-Patent Document proposes a multicore fiber having seven cores whose core Δ is any of three kinds of 0.38%, 0.39%, and 0.40%, while the cores adjacent to each other are arranged at a core interval of 40 μm.

However, the study of the above-mentioned Non-Patent Document 1 does not take account of bending of the multicore fiber. Therefore, it actually includes cases where crosstalk becomes very large depending on the bending state of the multicore fiber.

When a multicore fiber is bent, the respective bending radiuses of cores vary very slightly depending on their positions within the multicore fiber. Therefore, the optical path difference also varies among the cores. When thus bent multicore fiber is treated as a linear waveguide, it is necessary to use equivalent refractive index as a refractive index based on the optical path length difference. As described in the above-mentioned Non-Patent Document 2, the equivalent refractive index is determined by multiplying the actual refractive index by (1+r/R). Here, R is the radius of curvature of a core (reference core) to be taken as a reference, and r is the amount of deviation from the reference core in the bending radius direction (see FIG. 4(*a*)). Any core may be taken as a reference. Letting $n_0(r)$ be the actual refractive index of a bent multicore fiber, and $n_1(r)$ be the equivalent refractive index thereof calculated as a linear waveguide, the equivalent relative refractive index difference $\Delta_{eq}$, which is the relative refractive index difference between the actual refractive index and equivalent refractive index, is represented by the following expression (26) by using the parameters r and R:

$$\Delta_{eq} = \frac{n_1^2(r) - n_0^2(r)}{2n_1^2(r)} = \qquad (26)$$

$$\frac{n_0^2(r)\left(1 + \frac{r}{R}\right)^2 - n_0^2(r)}{2n_0^2(r)\left(\frac{r}{R}\right)^2} = \frac{\left(1 + \frac{r}{R}\right)^2 - 1}{2\left(1 + \frac{r}{R}\right)^2} = \frac{2\frac{r}{R} + \left(\frac{r}{R}\right)^2}{2\left(1 + \frac{r}{R}\right)^2}$$

Figure 4:
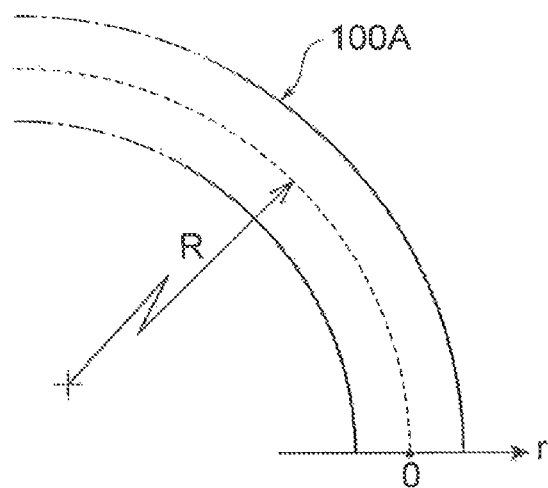
FIG. 4 is a table listing values of equivalent relative refractive index difference $\Delta_{eq}$ which is the relative refractive index difference between the actual refractive index and equivalent refractive index and which is obtained when parameters r and R concerning bending change.
Figure 5:
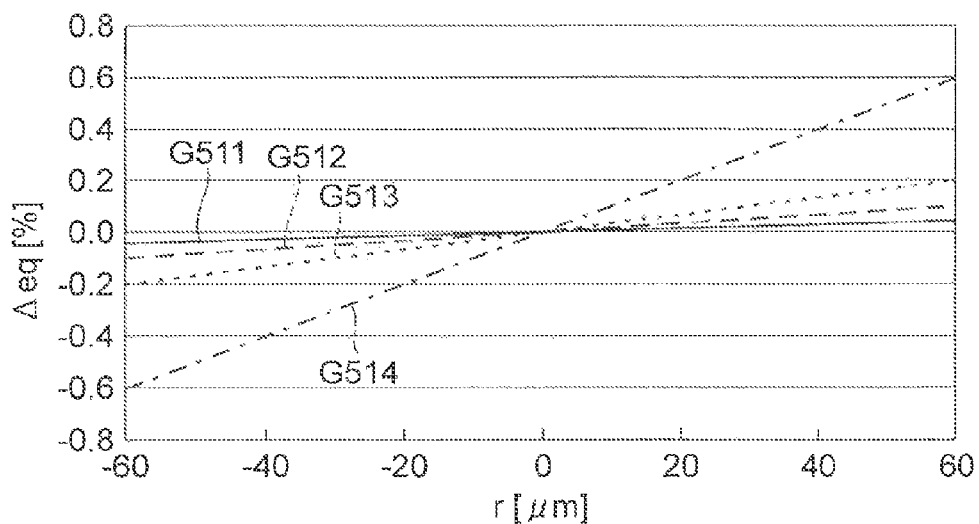
FIG. 5 is a set of charts showing relationships between parameter r and equivalent relative refractive index difference $\Delta_{eq}$ and between parameter (1/R) and equivalent relative refractive index difference $\Delta_{eq}$ in the table represented in FIG. 4(b)
Figure 5:
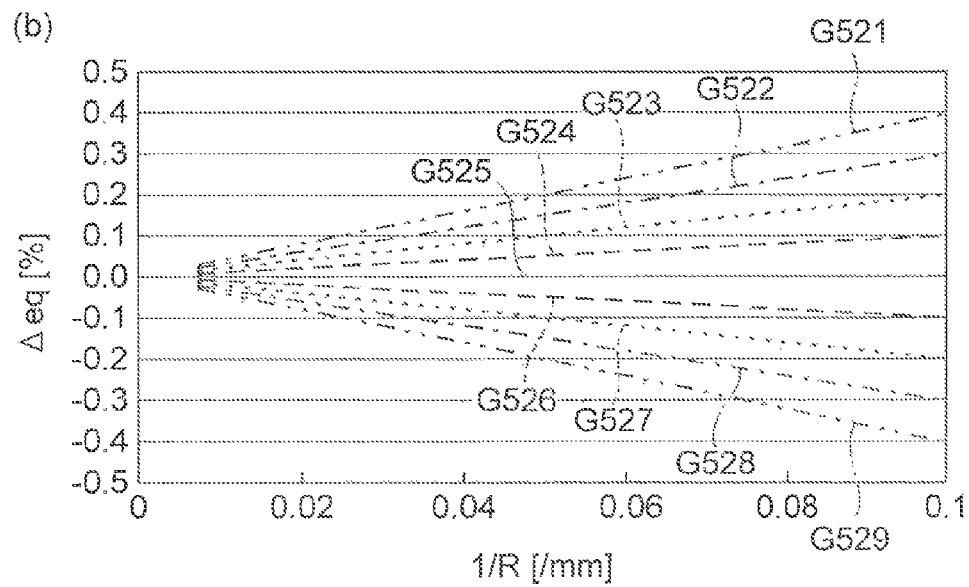

FIG. 4(*b*) is a table listing values of equivalent relative refractive index difference $\Delta_{eq}$ derived from the above-mentioned expression (26) when the parameters r and R concerning bending are changed. The following explanation will assume the center core 110A1 shown in FIGS. 1 and 2 to be the reference core unless otherwise mentioned. FIG. 5(*a*) shows relationships between the parameter r and equivalent relative refractive index difference $\Delta_{eq}$ in the table of FIG. 4(*b*), while FIG. 5(*b*) shows relationships between the parameter (1/R) and equivalent relative refractive index difference $\Delta_{eq}$ therein.

In FIG. 5(*a*), graphs G511, G512, G513, and G514 represent respective relationships between the parameter r and $\Delta_{eq}$ at R=140 mm, 60 mm, 30 mm, and 10 mm. In FIG. 5(*b*), graphs G521, G522, G523, G524, G525, G526, G527, G528, and G529 represent respective relationships between the parameter (1/R) and $\Delta_{eq}$ at r=40 μm, 30 μm, 20 μm, 10 μm, 0 μm, −10 μm, −20 μm, −30 μm, and −40 μm.

Here, when r=40 μm, $\Delta_{eq}$ exceeds the range of ±0.02% even when the parameter R=140 mm. In the multicore fiber proposed by the above-mentioned Non-Patent Document 1 including seven cores constituted by three kinds of cores having respective relative refractive index differences Δ of 0.38%, 0.39%, and 0.40% with cores adjacent to each other being arranged at core intervals of 40 μm, the difference in core Δ between different kinds of cores is 0.01%, whereby the relative refractive index difference $\Delta_{\mathit{eff}}$ between the effective refractive indexes is 0.01% or less. This shows that the bending with the parameter R=140 mm alone reverses the relationship between $\Delta_{eq}$ and $\Delta_{\mathit{eff}}$ in the multicore fiber of the above-mentioned Non-Patent Document 1. That is, it is seen that even slight bending may extraordinarily lower the absolute value of the relative refractive index difference between equivalent refractive indexes of effective refractive indexes in different kinds of cores, thereby enhancing the crosstalk between the cores.

Figure 6:
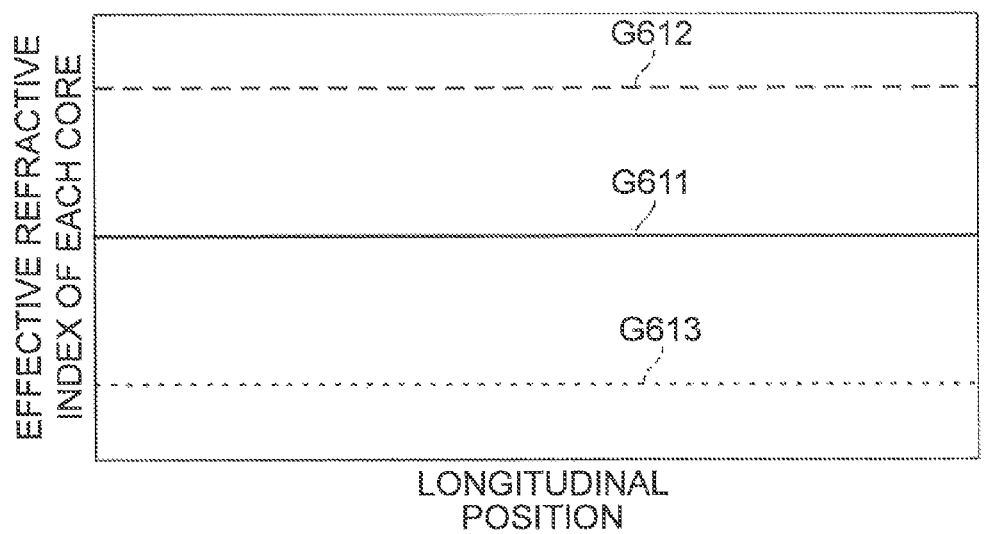
FIG. 6 is a set of charts showing the effective refractive index and equivalent refractive index of effective refractive index of each core in multicore optical fibers subjected to bending.
Figure 6:
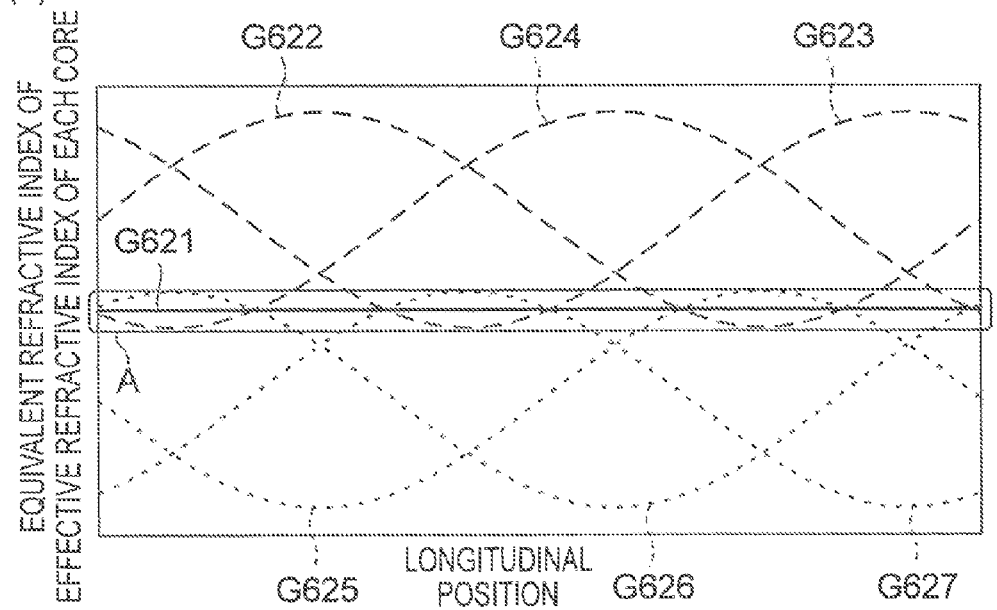

When winding a multicore fiber about a bobbin, the multicore fiber inevitably rotates because of fluctuations generated at the time of its manufacture or take-up, so that the core arrangement revolves along the longitudinal direction. Here, even when the core interval D between the reference core and each core is constant along the longitudinal direction, the above-mentioned parameter r varies within the core interval D depending on the position in the longitudinal direction of the multicore fiber, whereby sections where the difference in equivalent relative refractive index between the effective refractive indexes of the different kinds of cores is small are distributed along the longitudinal direction of the multicore fiber. FIG. 6 shows such a state. Here, FIG. 6(*b*) represents fluctuations in equivalent refractive index in such a setting that, in a state where the multicore fiber is bent uniformly in the longitudinal direction while its cores are arranged at equally-spaced intervals in the circumferential direction within a cross section of the optical fiber, the circumferential core positions rotate at a predetermined period in the longitudinal direction.

FIG. 6 is a set of charts showing the effective refractive index and equivalent refractive index of effective refractive index of each core in a multicore fiber when bent, which is an example of effective refractive index as converted into the equivalent refractive index in the case where the multicore fiber is bent as in the state wound about the bobbin. In particular, FIG. 6 represents the effective refractive index and equivalent refractive index of effective refractive index of each core in the multicore fiber 100A shown in FIG. 1. FIG. 6(a) shows the relationship between the longitudinal position of the multicore fiber and the effective refractive index of each core, in which graph G611 represents the effective refractive index of the center core (reference core) 110A1 located on the optical axis AX of the multicore fiber 100A, graph G612 the effective refractive index of the cores 110B1 to 110B3 located about the reference core 100A1, and graph G613 the effective refractive index of the cores 110C1 to 110C3 located about the reference core 110A1. FIG. 6(b) shows the longitudinal position of the multicore fiber vs. the equivalent refractive index of the effective refractive index in each core, in which graphs G621, G622, G623, G624, G625, G626, and G627 represent the respective equivalent refractive indexes of effective refractive indexes of the reference core 110A1 and the cores 110B1, 110B2, 110B3, 110C1, 110C2, and 110C3 located about the reference core 110A1.

Though, in view of the study mentioned above, the amount of deviation r from the reference core due to bending has been regarded as the amount of deviation r from the center core to each core while taking the center core as the reference core, it will now be replaced with the amount of deviation r between different kinds of cores. In this case, letting D be the core interval between different kinds of cores in a cross section of the multicore fiber, and R be the radius of curvature permissible on crosstalk, the relative refractive index difference $\Delta_{eff}$ between the actual effective refractive index (actual effective refractive index not converted into the equivalent refractive index) in one kind of core and the actual effective refractive index in another kind of core is required to satisfy at least the condition of the following expression (27):

$$\Delta_{eff} \geq \Delta_{eq} + \alpha = \frac{2\frac{D}{R} + \left(\frac{D}{R}\right)^2}{2\left(1 + \frac{D}{R}\right)^2} + \alpha \quad (27)$$

where α is the relative refractive index difference between the effective refractive indexes in different kinds of cores (having different refractive indexes) when sufficiently low crosstalk can be achieved by the multicore fiber designed without taking account of bending. The above-mentioned expression (16) configures the relative refractive index difference of the higher effective refractive index with respect to the lower effective refractive index such that $\Delta_{eff} > 0$ and sets the reference core such that $\Delta_{eq} > 0$.

According to the above-mentioned Non-Patent Document 1, a core Δ difference of 0.005% is sufficient when the core interval D=30 μm between cores adjacent to each other, so that 0.005% is also sufficient for the above-mentioned parameter α, whereby it is only necessary for the relative refractive index difference $\Delta_{eff}$ to satisfy the following expression (28) in terms of percent. This can suppress the core-to-core crosstalk even when bending at the radius of curvature R or greater is added.

$$\Delta_{eff} \geq \frac{2\frac{D}{R} + \left(\frac{D}{R}\right)^2}{2\left(1 + \frac{D}{R}\right)^2} \cdot 100 + 0.005 \ [\%] \quad (28)$$

A multicore fiber constituted by a plurality of cores may include a plurality of kinds of cores by plurals for each kind. In such a multicore fiber, the same kind of cores are arranged while keeping a sufficient core interval D so as to lower crosstalk. Therefore, letting $D_{min}$ be the shortest core interval between the same kind of cores, it is unnecessary to take account of the relative refractive index difference between the effective refractive indexes of different kinds of cores when their core interval D exceeds $D_{min}$, (since crosstalk is sufficiently low between the same kind of cores having the same effective refractive index). However, it is necessary for all the combinations of different kinds of cores exhibiting the core interval D of less than $D_{min}$, to satisfy at least the following expression (29). This is because the equivalent refractive index conversion of effective refractive index varies among the combinations of different kinds of cores whose core interval D is shorter than $D_{min}$. This can suppress the core-to-core crosstalk even when bending at the radius of curvature R or greater is added.

$$\Delta_{eff} > \frac{2\frac{D}{R} + \left(\frac{D}{R}\right)^2}{2\left(1 + \frac{D}{R}\right)^2} \cdot 100 \ [\%] \quad (29)$$

When the multicore fiber such as the one mentioned above permits the parameter R=30 mm, however, the relative refractive index difference $\Delta_{eff}$ must be 0.105% or higher if the core interval D=30 μm ($\Delta_{eff} \geq 0.0105\%$). It is not easy to achieve. This is because some contrivances are necessary to make a large difference in core Δ or core diameter between cores in the multicore fiber 100A, impart a difference to the refractive indexes of claddings surrounding different kinds of cores, and so forth.

The core-to-core crosstalk increases because of the fact that the difference in equivalent refractive index of effective refractive index between cores becomes very small. However, the core-to-core crosstalk seems to become smaller when the total length of sections, in which the difference is not greater than a certain value, is very short along the longitudinal direction of the multicore fiber 100A.

Hence, in a plurality of cores in the multicore fiber 100A, letting $n_{eff-m}$ be the effective refractive index of a core m, $n_{eff-nm}$ be the equivalent refractive index of effective refractive index of a core n with reference to the core m, $D_{nm}$ be the core interval (center-to-center distance) between the cores n and m, and $\phi_{nm}$ (rad) be the angle formed between a line mn and a line coinciding with the bending radius direction of the multicore fiber 100A, the relationship of the following expression (30) holds. Here, the line mn means a line connecting the centers of the cores m and n on a cross section of the multicore fiber orthogonal to the predetermined axis AX.

$$n_{eqeff-nm} = n_{eff-n}\left\{1 + \frac{D_{nm}\cos\theta_{nm}}{R}\right\} \quad (30)$$

Converting the above-mentioned expression (30) into propagation constants yields the following expression (31), since $\beta=(2\pi/\lambda)n_{eff}$, where h is the wavelength, and $n_{eff}$ is the effective refractive index.

$$\beta_{eq-nm} = \beta_n\left\{1 + \frac{D_{nm}\cos\theta_{nm}}{R}\right\} \quad (31)$$

Here, $\beta_n$ is the propagation constant of the core n, and $\beta_{eq-nm}$ is the propagation constant of the core n taking account of the equivalent refractive index with reference to the core m.

In this case, the difference $\Delta\beta_{nm}$ (which is not the relative refractive index difference) between $\beta_{eq-nm}$ and $\beta_{eq-mm}$ becomes the following expression (32):

$$\Delta\beta_{mn} = \beta_{eq-mn} - \beta_{eq-mm} = \beta_n\left\{1 + \frac{D_{nm}\cos\theta_{nm}}{R}\right\} - \beta_m = \beta_n\frac{D_{nm}\cos\theta_{nm}}{R} + (\beta_n - \beta_m) \quad (32)$$

The core-to-core crosstalk seems to become smaller as the ratio by which $\Delta\beta_{nm}$ attains a value near 0 is lower along the longitudinal direction of the multicore fiber. When the parameter R=30 mm is permitted here, it is not easy for the difference $\Delta\beta_{nm}$ to be always kept from becoming 0 while the core interval $D_{nm}$=30 μm between the cores n and m. This is because such a difference between the propagation constants $\beta_n$ and $\beta_m$ as to make the relative refractive index difference $\Delta_{eff}$ between the effective refractive indexes exceed 0.1% is necessary as shown in FIG. 3(b).

It is therefore considered that, while zero points of $\Delta\beta_{nm}$ exist along the longitudinal direction of the multicore fiber, it is desirable for the zero points to occur at low rate while exhibiting a steep gradient of $\Delta\beta_{nm}$ at each zero point. In particular, it is important for the gradient of $\Delta\beta_{nm}$ to be steep at each zero point.

Figure 7:
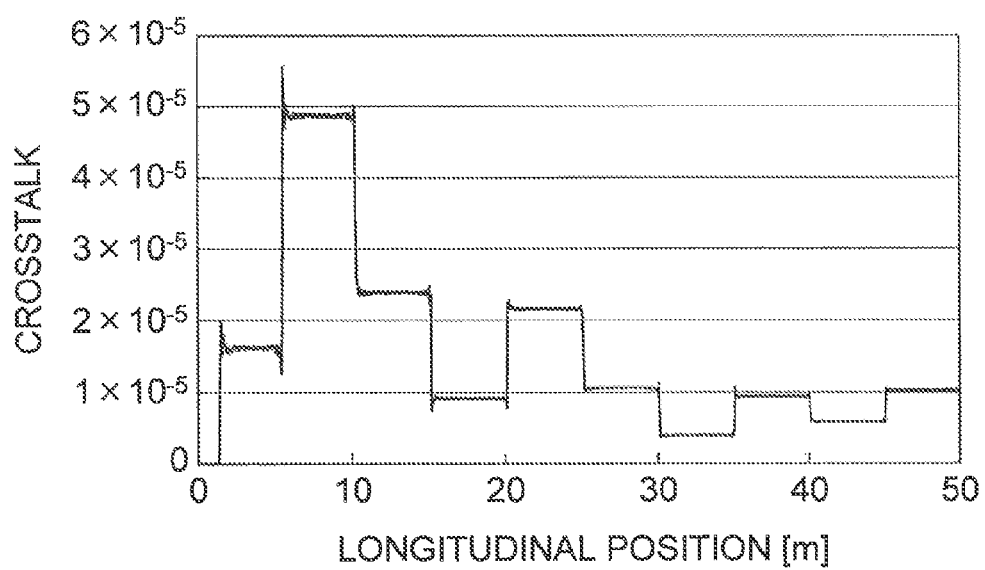
FIG. 7 is a graph showing fluctuations in core-to-core crosstalk along the longitudinal direction of a multicore optical fiber having two cores.

FIG. 7 is a graph showing fluctuations in core-to-core crosstalk (simply represented as "crosstalk" in FIG. 7) along the longitudinal direction of a multicore optical fiber having two cores (hereinafter referred to as 2-core fiber), which are specifically fluctuations occurring along the longitudinal direction of the 2-core fiber, when light having optical intensity $I_1$=1 is made incident on one of the two cores, in optical intensity $I_2$ of the other core. When the core-to-core crosstalk is defined as (intensity in a core free of incident light)/(total intensity of all the cores), the graph of FIG. 7 can be said to be a graph of fluctuations of crosstalk along the longitudinal direction of the 2-core fiber. The whole length of the 2-core fiber is bent constantly. A twist (a unidirectional rotation about the axis of the 2-core fiber) is imparted to the 2-core fiber along the longitudinal direction thereof. This twist rotates the 2-core fiber once per 10 m. That is, letting z be the position in the longitudinal direction of the 2-core fiber, there are two zero points of $\Delta\beta_{nm}$ (z) per 10 m. The acute changes in crosstalk existing at a ratio of 2 per 10 m at equally-spaced intervals in FIG. 7 are zero points of $\Delta\beta_{nm}$ (z).

While fluctuations in core-to-core crosstalk are calculated in the above-mentioned simulation, expressions representing behaviors of crosstalk will be constructed more simply in the following.

The reciprocal of the gradient obtained by the following expression (33a) at a given zero point z of $\Delta\beta_{nm}$ (z) can be taken as a measure representing the length by which $\Delta\beta_{nm}$ (z) exists near 0 when passing the zero point z. Hence, the core-to-core crosstalk amount χ at the given zero point is represented by the following expression (33b) as a measure and is considered to decrease as the value of the parameter 1 is smaller.

$$\frac{d}{dz}\Delta\beta_{nm}(z) \quad (33a)$$

$$l = \left|\frac{1}{\frac{d}{dz}\Delta\beta_{nm}(z)\Big|_{\Delta\beta_{nm}(z)=0}}\right| \quad (33b)$$

Significant core-to-core crosstalk is assumed to occur only in close vicinity of the zero point z. Here, when the above-mentioned expressions (24) and (25) are considered, F=1 and L=(π/2)·(1/κ) from the relationship of the following expression (34a). In terms of coupling between two cores in the case where F=1 and L=(π/2)−(1/κ), when light having optical intensity $I_1$=1 is made incident on one core 1, the intensity $I_2$ at the position z of the other core 2 in the longitudinal direction of the 2-core fiber will be represented by the following expression (34b):

$$\psi=\Delta\beta_{21}/2=0 \quad (34a)$$

$$I_2 = \sin^2\left(\frac{\kappa}{2\pi}z\right) \quad (34b)$$

When $I_1 \gg I_2$ here, z in the above-mentioned expression (34b) can be considered near 0 in the vicinity of each zero point of $\Delta\beta_{nm}(z)$. Therefore, the intensity $I_2$ can be represented by the following expression (35):

$$I_2 \approx \left(\frac{\kappa}{2\pi}\right)^2 z^2 \quad (35)$$

Additionally taking account of the fact that the respective values of F and L gradually change when shifting from zero points of $\Delta\beta_{nm}(z)$, the core-to-core crosstalk amount χ in the vicinity of a given zero point of $\Delta\beta_{nm}(z)$ seems to be represented by the following expression (36):

$$\chi = \left(\frac{\kappa_{nm}}{2\pi}\right)^2 \alpha\left|\frac{1}{\frac{d}{dz}\Delta\beta_{nm}(z)\Big|_{\Delta\alpha\beta_{nm}(z)=0}}\right| \quad (36)$$

where α is a coefficient for joining the above-mentioned expressions (33b) and (35) to each other.

In the following, the core-to-core crosstalk amount χ will be determined for some cases.

Among the parameters in the above-mentioned expression (32), $\theta_{nm}$ is the one that becomes a function of z, whereby the case where the relationship of the following expression (37) holds (wherein $\gamma_c \neq 0$) will be considered.

$$\theta_{nm}(z)=\gamma_c z \quad (37)$$

When the position z in the longitudinal direction of the 2-core fiber is given by the following expression (38a) here, $\Delta\beta_{nm}(z)=0$, so that the relationship represented by the following expression (38b) holds at any point, while the core-to-core crosstalk amount $\chi$ is represented by the following expression (38c) at any point.

$$z = \pm \frac{1}{\gamma_c} \left\{ \operatorname{acos}\left(\frac{R}{D_{nm}} \frac{\beta_m - \beta_n}{\beta_n}\right) + 2\pi k \right\} \quad (38a)$$

(where k is an integer and a range of acos(x) is $[0,\pi]$.)

$$\left|\frac{d}{dz}\Delta\beta_{nm}(z)\right| = \beta_n |\gamma_c| \sqrt{\left(\frac{D_{nm}}{R}\right)^2 - \left(\frac{\beta_m - \beta_n}{\beta_n}\right)^2} \quad (38b)$$

$$\chi = \alpha \left(\frac{\kappa_{nm}}{2\pi}\right)^2 \frac{1}{\beta_n} \frac{1}{\gamma_c} \frac{1}{\sqrt{\left(\frac{D_{nm}}{R}\right)^2 - \left(\frac{\beta_m - \beta_n}{\beta_n}\right)^2}} \quad (38c)$$

In the case of the relationship represented by the following expression (39a) (wherein $\gamma_a \geq \pi$, and $\gamma_f > 0$), the relationship represented by the following expression (39c) holds at the position z in the longitudinal direction of the 2-core fiber (the following expression (39b)) where $\Delta\beta_{nm}(z)=0$, so that the crosstalk amount $\chi$ between the two cores is represented by the following expression (39d):

$$\theta_{nm}(z) = \gamma_a \cos(\gamma_f z) \quad (39a)$$

$$z = \frac{1}{\gamma_f}\left\{\pm \operatorname{acos}\left(\frac{1}{\gamma_a}\left\{\pm \operatorname{acos}\left(\frac{R}{D_{nm}}\frac{\beta_m - \beta_n}{\beta_n}\right) + 2\pi k_1\right\}\right) + 2\pi k_3\right\} \quad (39b)$$

(where double signs are arbitrary and each of $k_1$ and $k_3$ is an integer in a range satisfying the domain of the arccosine function in the expression.)

$$\left|\frac{d}{dz}\Delta\beta_{nm}(z)\right| = \beta_n \gamma_c \sqrt{\left(\frac{D_{nm}}{R}\right)^2 - \left(\frac{\beta_m - \beta_n}{\beta_n}\right)^2} \\ \sqrt{\gamma_a^2 - \left\{\pm \operatorname{acos}\left(\frac{R}{D_{nm}}\frac{\beta_m - \beta_n}{\beta_n}\right) + 2\pi k_1\right\}^2} \quad (39c)$$

$$\chi = \alpha\left(\frac{\kappa_{nm}}{2\pi}\right)^2 \frac{1}{\beta_n}\frac{1}{\gamma_f} \frac{1}{\sqrt{\left(\frac{D_{nm}}{R}\right)^2 - \left(\frac{\beta_m - \beta_n}{\beta_n}\right)^2}} \\ \frac{1}{\sqrt{\gamma_a^2 - \left\{\pm \operatorname{acos}\left(\frac{R}{D_{nm}}\frac{\beta_m - \beta_n}{\beta_n}\right) + 2\pi k_1\right\}^2}} \quad (39d)$$

(where $k_1$ is an integer in a range satisfying the domain of the arccosine function in the expression.)

For lowering the core-to-core crosstalk amount $\chi$ in the 2-core fiber, it is necessary to increase the core interval $D_{nm}$ between the two cores n and m, lower the parameter R (radius of curvature for the 2-core fiber), or reduce the difference between the propagation constants $\beta_n$ and $\beta_m$ of the cores n and m (i.e., decrease the difference between $n_{eff\text{-}n}$ and $n_{eff\text{-}m}$). In particular, increasing the core interval $D_{nm}$ between the two cores n and m can also lower the core-to-core coupling coefficient $\kappa$ thereby yielding greater effect in reducing the core-to-core crosstalk. Enhancing the parameters $\gamma_c$ and $\gamma_f$ can also reduce the core-to-core crosstalk amount $\chi$.

As can also be seen from the foregoing explanation, it is desirable that $n_{eff\text{-}n}=n_{eff\text{-}m}$ from the viewpoint of the core-to-core crosstalk amount as well, whereby the multicore fiber 100A can be manufactured by the same core structure and thus can be achieved easily. Therefore, the following explanation will discuss the case where $n_{eff\text{-}n}=n_{eff\text{-}nm}$.

In the case where $n_{eff\text{-}n}=n_{eff\text{-}m}$, the above-mentioned expressions (38c) and (38d) can be written as the following expressions (40a) and (40b), respectively.

$$\chi = \alpha\left(\frac{\kappa_{nm}}{2\pi}\right)^2 \frac{1}{\beta_n}\frac{1}{\gamma_c}\frac{R}{D_{nm}} \quad (40a)$$

$$\chi = \alpha\left(\frac{\kappa_{nm}}{2\pi}\right)^2 \frac{1}{\beta_n}\frac{1}{\gamma_f}\frac{R}{D_{nm}}\frac{1}{\sqrt{\gamma_a^2 - (\pi k)^2}} \quad (40b)$$

(where k is an integer satisfying $$-\frac{\gamma_a}{\pi} \leq k \leq \frac{\gamma_a}{\pi}.)$$

The core-to-core crosstalk amount $\chi$ in the 2-core fiber will now be studied by another method. For simplification, the case with the above-mentioned expression (40a) will be considered.

Letting A be the complex electric field amplitude determined by slowly varying envelope approximation, the mode-coupling equation is represented by the following expression (41):

$$\frac{\partial A_n}{\partial z} = -j\kappa_{nm}\exp(-j\{\phi_m(z) - \phi_n(z)\})A_m \quad (41)$$

Here, letting $\gamma_c$ [rad/m] be the twist of the optical fiber, it is represented by the following expression (42):

$$\begin{cases} \phi_m(z) = \beta_m z \\ \phi_n(z) = \int_0^z \beta_n\left\{1 + \frac{D_{nm}}{R}\cos\theta_n(z')\right\}dz' \\ \theta_m(z) = \gamma_c z \end{cases} \quad (42)$$

Here, $\beta_m$, $\beta_n$, $D_{nm}$, and R are in such relationships that the cores n and m may have the same equivalent effective refractive index depending on the position of z. While the analytical solution of the complex electric field amplitude $A_n$ of the core n is typically hard to determine, since the complex electric field amplitude $A_m$ of the core m fluctuates longitudinally because there is also coupling from the core n to the core m, $A_m$ can be approximated by 1 when crosstalk is sufficiently small. In this case, the integral represented by the following expression (43) holds.

$$A_n(z) = -j\kappa_{nm}\int_0^z \exp(-j\{\phi_m(z') - \phi_n(z')\})dz' \quad (43)$$

Here, in view of the above-mentioned expression (42) and respective collateral conditions concerning the variables included therein, there is at least one point where the cores n and m have the same equivalent effective refractive index during when z changes from 0 to $\pi/\gamma_c$. Hence, the crosstalk amount $\chi$ can be represented by the following expression (44):

$$\chi = \left| A_n\left(\frac{\pi}{\gamma_c}\right) \right|^2 \tag{44}$$

The following expression (45) represents the result of solving the above-mentioned expression (44) with respect to $A_n(\pi/\gamma_c)$.

$$A_n\left(\frac{\pi}{\gamma_c}\right) = -j\kappa_{nm}\int_0^{\pi/\gamma_c} \exp(-j\{\phi_m(z') - \phi_n(z')\})dz' \tag{45}$$

$$-j\kappa_{nm}\int_0^{\pi/\gamma_c} \exp\left(-j\left\{\beta_m z' - \left(\beta_n z' + \beta_n \frac{D_{nm}}{\gamma_c R}\sin(\gamma_c z')\right)\right\}\right)dz'$$

$$-j\kappa_{nm}\int_0^{\pi/\gamma_c} \exp\{-j(\beta_m - \beta_n)z'\}\exp\left\{j\frac{\beta_n D_{nm}}{\gamma_c R}\sin(\gamma_c z')\right\}dz'$$

$$-j\kappa_{nm}\int_0^{\pi/\gamma_c} \exp\{-j(\beta_m - \beta_n)z'\}\sum_v J_v\left(\frac{\beta_n D_{nm}}{\gamma_c R}\right)\exp(jv\gamma_c z')dz'$$

$$-j\kappa_{nm}\sum_v \int_0^{\pi/\gamma_c} J_v\left(\frac{\beta_n D_{nm}}{\gamma_c R}\right)\exp\{-j(\beta_m - \beta_n - v\gamma_c)z'\}dz'$$

$$-j\kappa_{nm}\left\{\frac{\pi}{\gamma_c} J_v\left(\frac{\beta_n D_{nm}}{\gamma_c R}\right)|_{\beta_m - \beta_n - v\gamma_c = 0} + \right.$$

$$\left. \sum_{\beta_m - \beta_n - v\gamma_c \neq 0} \left[ J_v\left(\frac{\beta_n D_{nm}}{\gamma_c R}\right)\frac{\exp\{-j(\beta_m - \beta_n - v\gamma_c)z'\}}{-j(\beta_m - \beta_n - v\gamma_c)} \right]_0^{\frac{\pi}{\gamma_c}} \right\}$$

Assuming that the relationship $\beta_m = \beta_n$ holds here, the above-mentioned expression (45) can be rewritten as the following expression (46):

$$A_n\left(\frac{\pi}{\gamma_c}\right) = -j\frac{\kappa_{nm}}{\gamma_c}\left\{ J_0\left(\frac{\beta_n D_{nm}}{\gamma_c R}\right)\pi + j\sum_{v \neq 0} \frac{(-1)^v - 1}{v} J_v\left(\frac{\beta_n D_{nm}}{\gamma_c R}\right) \right\} \tag{46}$$

Further, using the relationship of an expression (following expression (47)) described in the above-mentioned Non-Patent Document 2, the above-mentioned expression (46) can be deformed as in the following expression (48):

$$J_v(x) \approx \sqrt{\frac{2}{\pi x}} \cos\left(x - \frac{2v+1}{4}\pi\right)[x \gg 1] \tag{47}$$

$$A_n\left(\frac{\pi}{\gamma_c}\right) = -j\frac{\kappa_{nm}}{\gamma_c}\left\{ \sqrt{2\pi \frac{\gamma_c R}{\beta_n D_{nm}}} \cos\left(\frac{\beta_n D_{nm}}{\gamma_c R} - \frac{\pi}{4}\right) + \right.$$

$$\left. j\sqrt{\frac{2}{\pi}\frac{\gamma_c R}{\beta_n D_{n,m}}} \sum_{v \neq 0} \frac{(-1)^v - 1}{v}\cos\left(\frac{\beta_n D_{nm}}{\gamma_c R} - \frac{2v+1}{4}\pi\right) \right\}$$

The imaginary term (total sum term) in braces on the right side of the above-mentioned expression (48) will now be studied. First, the imaginary term of the above-mentioned expression (48) can be deformed by utilizing the relationship of the following expression (49):

-continued $$= -j\frac{\kappa_{nm}}{\gamma_c}\left\{ \sqrt{2\pi \frac{\gamma_c R}{\beta_n D_{nm}}} \cos\left(\frac{\beta_n D_{nm}}{\gamma_c R} - \frac{\pi}{4}\right) + \right. \tag{48}$$

$$\left. \frac{j}{\pi}\sum_{v \neq 0} \frac{(-1)^v - 1}{v}\cos\left(\frac{\beta_n D_{nm}}{\gamma_c R} - \frac{2v+1}{4}\pi\right) \right\}$$

$$\sum_{v \neq 0} \frac{(-1)^v - 1}{v}\cos\left(x - \frac{2v+1}{4}\pi\right) = \sum_{v \neq 0} \frac{(-1)^v - 1}{v}\left\{\cos\left(x - \frac{\pi}{4}\right)\cos\left(\frac{v}{2}\pi\right) + \right. \tag{49}$$

$$\left. \sin\left(x - \frac{\pi}{4}\right)\sin\left(\frac{v}{2}\pi\right)\right\}$$

$$= \cos\left(x - \frac{\pi}{4}\right)\sum_{v \neq 0} \frac{(-1)^v - 1}{v}\cos\left(\frac{v}{2}\pi\right) +$$

$$\sin\left(x - \frac{\pi}{4}\right)\sum_{v \neq 0} \frac{(-1)^v - 1}{v}\sin\left(\frac{v}{2}\pi\right)$$

Here, the first term of the right side is an odd function with respect to v and thus becomes 0. The second term on the right side is an even function with respect to v and thus can be organized by utilizing an expression (following expression (50)) described in the above-mentioned Non-Patent Document 3, so as to be represented as the following expression (51):

$$\sum_{v=1}^{\infty} \frac{\sin\{(2n-1)x\}}{2n-1} = \begin{cases} \frac{\pi}{4} & [0 < x < \pi] \\ 0 & [x = \pi] \\ \frac{-\pi}{4} & [\pi < x < 2\pi] \end{cases}$$ (50)

$$\sin\left(x - \frac{\pi}{4}\right) \sum_{v \neq 0} \frac{(-1)^v - 1}{v} \sin\left(\frac{v}{2}\pi\right) = 2\sin\left(x - \frac{\pi}{4}\right) \sum_{v=1}^{\infty} \frac{(-1)^v - 1}{v} \sin\left(\frac{v}{2}\pi\right)$$ (51)

$$= 2\sin\left(x - \frac{\pi}{4}\right) \sum_{v'=1}^{\infty} \frac{-2}{2v'-1} \sin\left\{(2v'-1)\frac{\pi}{2}\right\}$$

$$= -2 \cdot 2\sin\left(x - \frac{\pi}{4}\right) \sum_{v'=1}^{\infty} \frac{\sin\{(2v'-1)\frac{\pi}{2}\}}{2v'-1}$$

$$= -\pi \sin\left(x - \frac{\pi}{4}\right)$$

Utilizing thus obtained expressions (49) and (51) mentioned above, the above-mentioned expression (48) can be organized as in the following expression (52):

$$A_n\left(\frac{\pi}{\gamma_c}\right) = -j \frac{\kappa_{nm}}{\gamma_c} \sqrt{2\pi \frac{\gamma_c R}{\beta_n D_{nm}}} \left\{ \cos\left(\frac{\beta_n D_{nm}}{\gamma_c R} - \frac{\pi}{4}\right) - j\sin\left(\frac{\beta_n D_{nm}}{\gamma_c R} - \frac{\pi}{4}\right) \right\}$$ (52)

$$= \frac{\kappa_{nm}}{\gamma_c} \sqrt{2\pi \frac{\gamma_c R}{\beta_n D_{nm}}} \exp\left[-j\left(\frac{\beta_n D_{nm}}{\gamma_c R} - \frac{\pi}{4}\right)\right]$$

Hence, from the above-mentioned expression (44), the crosstalk amount $\chi$ can be determined as in the following expression (53):

$$\chi = \frac{\kappa_{nm}^2}{\beta_n} \frac{R}{D_{nm}} \frac{2\pi}{\gamma_c}$$ (53)

Since the above-mentioned expression (53) equals the above-mentioned expression (40a), the following expression (54) can be derived therefrom.

$$\beta = (2\pi)^3$$ (54)

Figure 8:
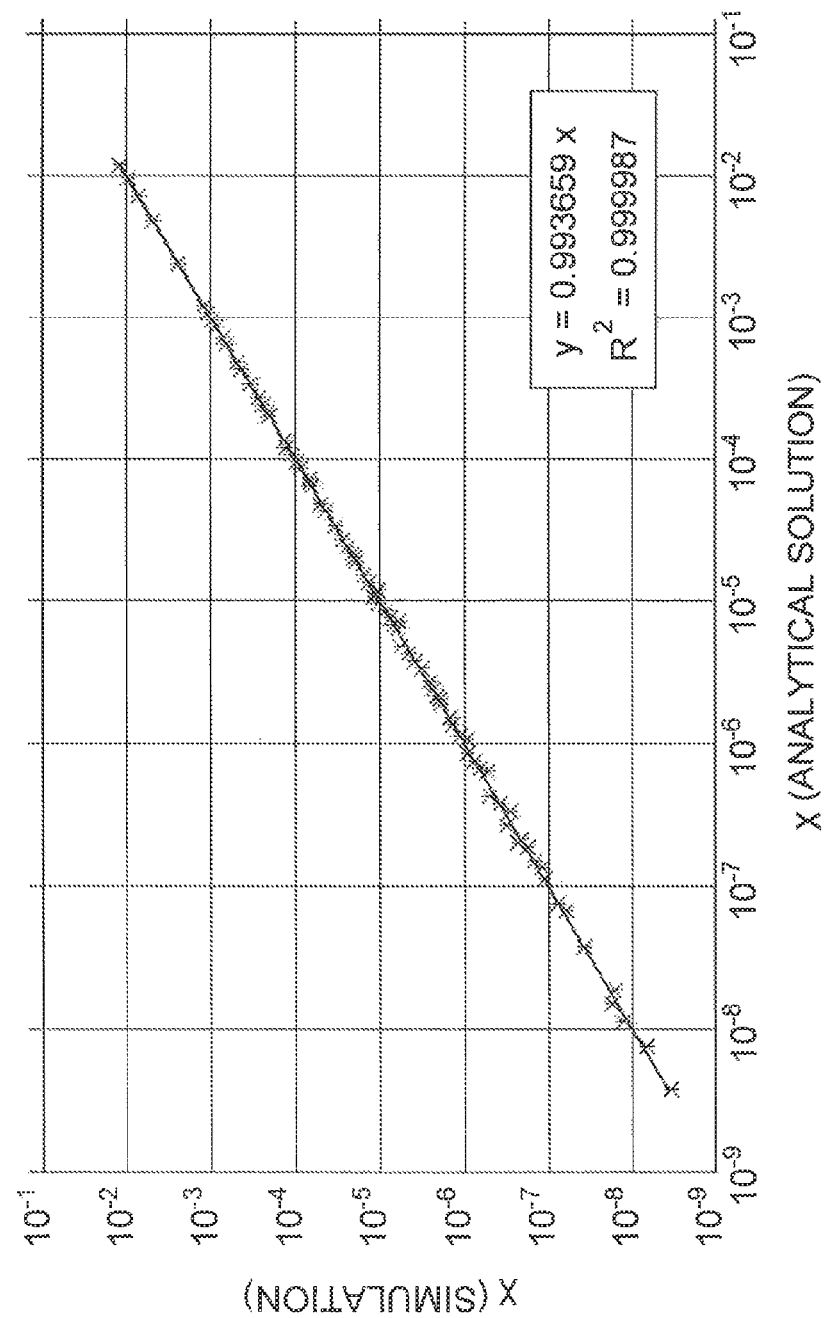
FIG. 8 is a graph showing the relationship between an analytical solution and values determined by a simulation based on a mode-coupling equation.

Here, concerning the crosstalk amount $\chi$, the analytical solution of the above-mentioned expression (53) and values determined by a simulation based on the mode-coupling equation are represented in FIG. 8.

Represented here are results of calculations concerning all the combinations of the wavelength of 1.55 µm, core Δ of 0.34% and 0.4%, R of 60 mm, 120 mm, 180 mm, 240 mm, and 300 mm, and $D_{nm}$ of 35 µm and 40 µm. The analytical solution matches well with the results of simulation, whereby the correctness of the analytical solution and that of simulation can be verified with each other.

Meanwhile, the crosstalk amount $\chi$ is the amount of fluctuation of crosstalk at a zero point of the equivalent propagation constant difference between cores, whereby the relationship of the following expression (55) is seen to hold under assumption of low crosstalk in terms of change in the complex electric field amplitude. In the following expression (55), $A_n(n_{zero})$ is $A_n$ after passing $n_{zero}$ zero points of the equivalent propagation constant difference. While being $\arg(jA_n/A_n)$ at each zero point, $\phi_{random}$ takes random values at each zero point depending on fluctuations in $\gamma_c$, R, and the like in practice and thus is represented as follows:

$$A_n(n_{zero}+1) = A_n(n_{zero}) + \sqrt{\chi} \exp(j\phi_{random})$$ (55)

First Embodiment

Here, the two values represented by the following expression (56a) follow a probability distribution of $\sigma^2 = \chi/2$ and thus, if $n_{zero}$ is sufficiently large, are probabilistically independent from each other and distributed as a probability distribution which is a normal distribution having the same dispersion $\sigma^2 = \chi/2 \times n_{zero}$ in accordance with the central limit theorem. While being inherently an integer, $n_{zero}$ can be rewritten as the following expression (56b) when the above-mentioned expression (39c) holds.

$$\Re\{\sqrt{\chi} \exp(j\phi_{random})\}, \Im\{\sqrt{\chi} \exp(j\phi_{random})\}$$ (56a)

$$n_{zero} = \frac{\gamma_c}{\pi} L_F$$ (56b)

In this case, $\sigma^2$ satisfies the following expression (57). Here, $L_F$ is the fiber length.

$$\sigma^2 = \frac{\kappa_{nm}^2}{\beta_n} \frac{R}{D_{nm}} L_F$$ (57)

Here, the value represented by the following expression (58a) is distributed in accordance with expression (58b) which is a chi-squared distribution with 2 degrees of freedom, while its cumulative distribution function becomes expression (58c).

$$\frac{|A_n(n_{zero})|^2}{\sigma^2}$$ (58a)

$$f(x) = \frac{1}{2}\exp\left(-\frac{x}{2}\right) \tag{58b}$$

$$F(x) = 1 - \exp\left(-\frac{x}{2}\right) \tag{58c}$$

For reference, the probability density function of the following expression (59a) becomes the following expression (59b), while its mode value is $10 \cdot \log_{10} 2\sigma^2$.

$$10 \log_{10}|A_n(n_{zero})|^2 \tag{59a}$$

$$f(x) = \frac{\ln 10}{10} \frac{10^{\frac{x}{10}}}{2\sigma^2} \exp\left(-\frac{10^{\frac{x}{10}}}{2\sigma^2}\right) \tag{59b}$$

Here, letting $XT_P$ be the crosstalk when the cumulative distribution is P, the relationship of the following expression (60) holds.

$$F\left(\frac{XT_P}{\sigma^2}\right) = 1 - \exp\left(-\frac{XT_P}{2\sigma^2}\right) = P \tag{60}$$

In order for the crosstalk to become $XT_S$ at a probability of P or higher, the relationship $XT_P \leq XT_S$ is required to be satisfied, whereby the relationship of the following expression (61a) is obtained, which is further modified, so as to yield the relationships of the following expressions (61b) to (61d):

$$XT_P = -2\sigma^2 \ln(1-P) = -2\frac{\kappa_{nm}^2}{\beta_n} \frac{R}{D_{nm}} L_F \ln(1-P) \leq XT_S \tag{61a}$$

$$\kappa_{nm} \leq \kappa_{nm-th} = \sqrt{\frac{1}{-2\ln(1-P)} \frac{D_{n,m}}{R} \frac{\beta_n}{L_F} XT_S} \tag{61b}$$

$$D_{nm} \geq D_{nm-th} = -2\ln(1-P)\frac{R\kappa_{nm}^2 L_F}{\beta_n XT_S} \tag{61c}$$

$$R \leq R_{th} = \frac{1}{-2\ln(1-P)} \frac{D_{n,m}\beta_n}{\kappa_{nm}^2 L_F} XT_S \tag{61d}$$

When P, $XT_S$, and $L_F$ are provided here, relational expressions to be satisfied by the parameters become clear. When a multicore optical fiber provided with a plurality of cores having the same structure is designed such as to have a core-to-core distance of $D_{nm-th}$ or greater with a coupling coefficient of $\kappa_{nm-th}$ or less and bent at a radius of $R_{th}$ or less, the crosstalk can be suppressed to $XT_S$ or less at a probability of P or higher.

Figure 9:
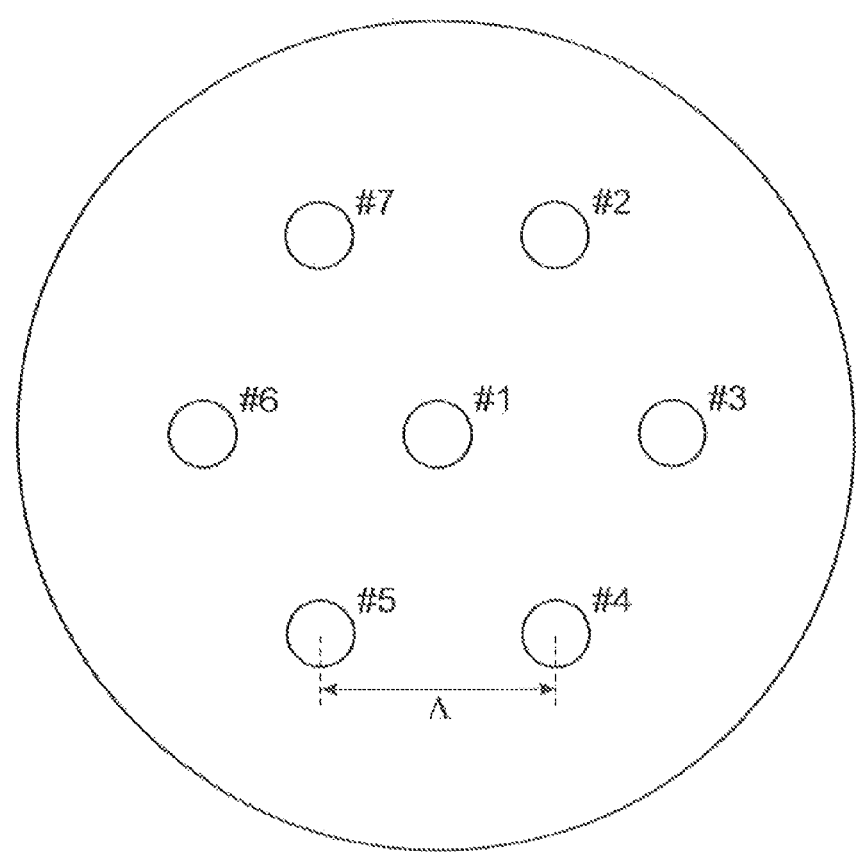
FIG. 9 is a diagram showing a cross section of a multicore optical fiber having seven cores.

An optical fiber (hereinafter referred to as "7-core optical fiber") having seven cores #1 to #7 as shown in FIG. 9 will now be considered. Since the coupling coefficient between cores decreases exponentially as the core interval increases, it can be assumed that only adjacent cores should be taken into consideration for crosstalk. In this case, the core 1 having the largest number of adjacent cores is influenced by crosstalk from the six cores disposed thereabout. Here, letting Λ be the core pitch, the above-mentioned expressions (61a) to (61d) can be rewritten as the following expressions (62a) to (62d), respectively. Even when seven or more cores are arranged into a hexagonal lattice, the expressions to be taken into consideration are the following expressions (62a) to (62d):

$$XT_P = -2 \cdot 6\sigma^2 \ln(1-P) = -12\frac{\kappa^2}{\beta} \frac{R}{\Lambda} L_F \ln(1-P) \leq XT_S \tag{62a}$$

$$\kappa \leq \kappa_{th} = \sqrt{\frac{1}{-12\ln(1-P)} \frac{\Lambda}{R} \frac{\beta}{L_F} XT_S} \tag{62b}$$

$$\Lambda \geq \Lambda_{th} = -12\ln(1-P)\frac{R\kappa^2 L_F}{\beta XT_S} \tag{62c}$$

$$R \leq R_{th} = \frac{1}{-12\ln(1-P)} \frac{\Lambda\beta}{\kappa^2 L_F} XT_S \tag{62d}$$

For example, letting P=0.9999, Λ=40 [μm], R=200 [mm], $\beta = 2\pi/\lambda n_{eff}$, $L_F$=100 [km], $XT_S$=0.001, λ=1625 [nm], and $n_{eff}$=1.444 here, $\kappa \geq 3.18 \times 10^{-4}$, which shows it necessary to have very small κ. As Λ is made greater, $K_{th}$ increases, while the value of κ itself decreases exponentially. Even when Λ is about 40 rpm, κ must be made very small as mentioned above. For achieving this, a single-mode optical fiber with a step index type core must have large core Δ with small MFD.

Figure 10:
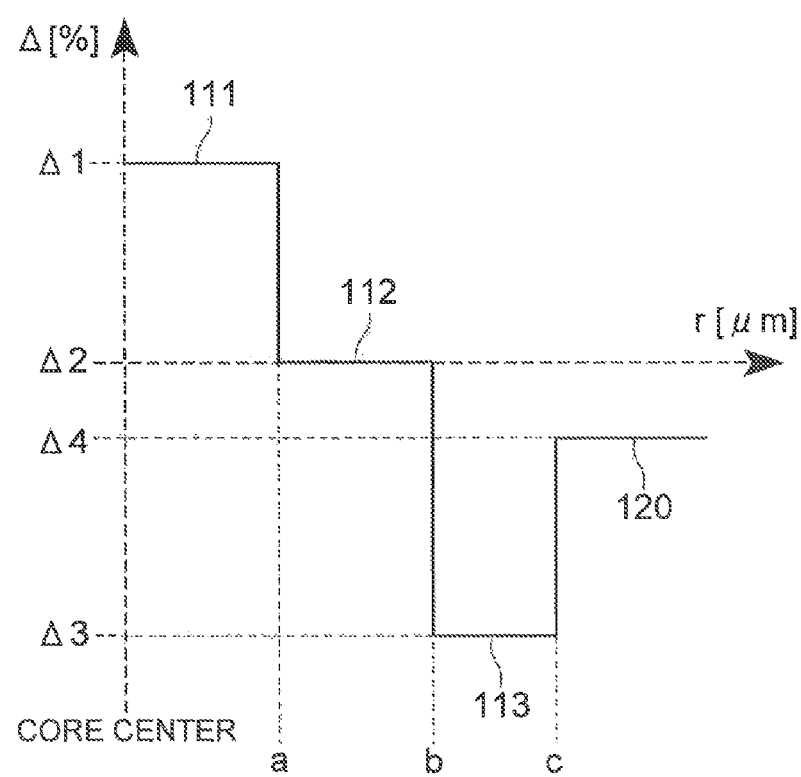
FIG. 10 is a diagram showing a refractive index profile of multicore optical fibers according to first and second embodiments.

Searching for a structure having at least cable cutoff wavelength λcc and mode field diameter (MFD) conforming to ITU-T G.654.A and satisfying P=0.9999, R=200 [mm], $L_F$=100 [km], $XT_S$=0.001, and λ=1625 [nm] finds out that a trench type optical fiber shown in FIG. 10 is one of desirable structures. That is, each of the core portions #1 to #7 comprises a first core portion 111, a second core portion 112, and a trench layer 113, each of which is covered with a cladding region 120. The first core portion 111 has a refractive index higher than that of the cladding region 120. The second core portion 112 is disposed about the first core portion 111 and has a refractive index different from that of the first core portion 111. The trench layer 113 is disposed so as to surround the second core portion 112 and has a refractive index lower than that of the cladding region 120. Letting a be the radius of the first core portion 111, Ra be the ratio of the outer diameter of the first core portion 111 to the outer diameter of the second core portion 112, Rb be the ratio of the outer diameter of the second core portion 112 to the outer diameter of the trench layer 113, Δ1 be the relative refractive index difference of the first core portion 111 with respect to the second core portion 112, Δ3 be the relative refractive index difference of the trench layer 113 with respect to the second core portion 112, and Δ4 be the relative refractive index difference of the cladding region 120 with respect to the second core portion 112, one of desirable structures is found to satisfy a=4.99 [m], Ra=0.66, Rb=0.491, Δ1=0.36[%], Δ3=−0.45[%], and Δ4=0.0[%]. Here, the refractive index of silica glass in the second core portion 112 does not always satisfy Δ=0% even when a reference is taken such that Δ2=0 [%].

Figure 11:
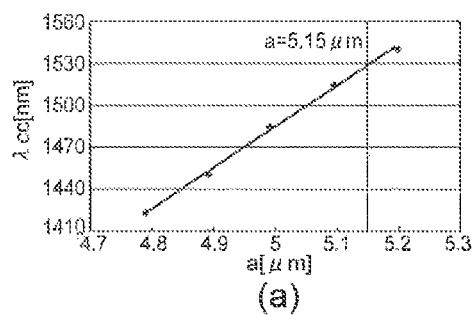
FIG. 11 is a set of charts showing relationships between structural parameters and cable cutoff wavelength (λcc) in the multicore optical fibers according to the first and second embodiments.
Figure 11:
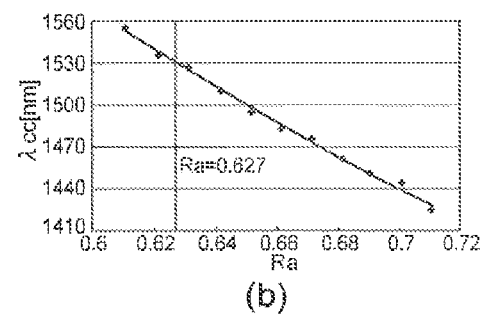
Figure 11:
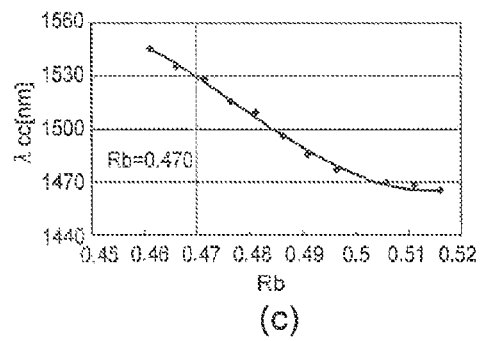
Figure 11:
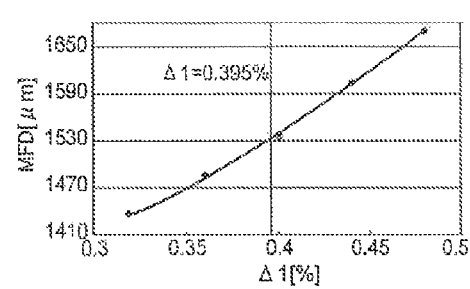
Figure 11:
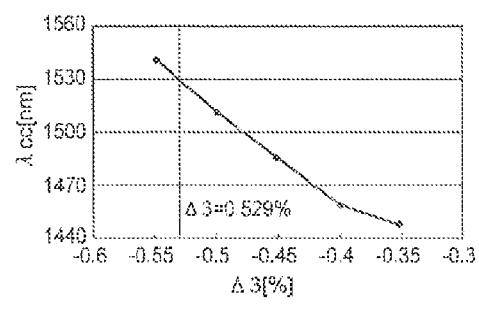
Figure 11:
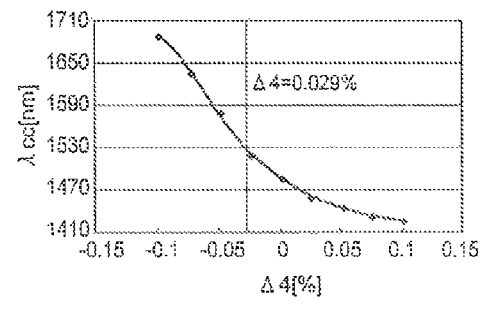

When investigating ranges to be satisfied by the parameters in the vicinity of the above-mentioned structure while keeping the restriction on the standard of G.654.A that λcc≤1530 nm, the following expressions (63) to (68) are obtained from FIG. 11.

$$a \leq 5.15 [\mu m] \tag{63}$$

$$Ra \geq 0.627 \tag{64}$$

$$Rb \geq 0.470 \tag{65}$$

$$\Delta 1 \leq 0.395[\%] \tag{66}$$

$$\Delta 3 \geq -0.529[\%] \quad (67)$$

$$\Delta 4 \geq -0.029[\%] \quad (68)$$

Figure 12:
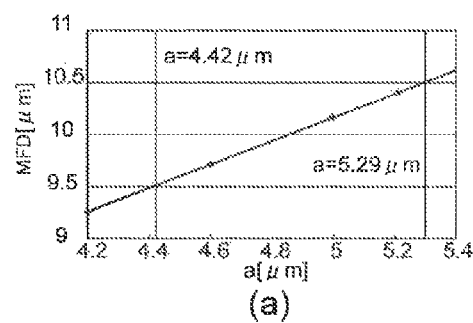
FIG. 12 is a set of charts showing relationships between structural parameters and mode field diameter (MFD) in the multicore optical fiber according to the first embodiment.
Figure 12:
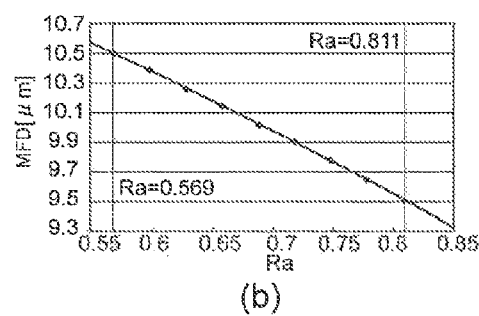
Figure 12:
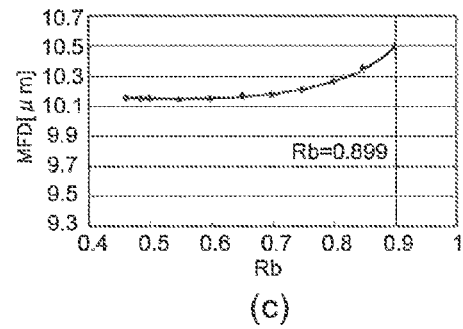
Figure 12:
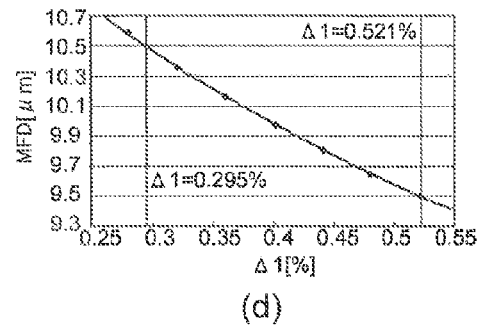
Figure 12:
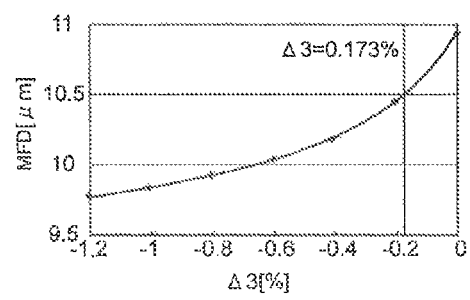
Figure 12:
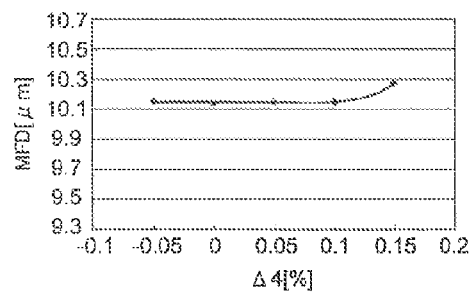

Since the standard requires the average value of mode field diameter (MFD) at a wavelength of 1550 nm to fall within the range of 9.5 to 10.5 μm, FIG. 12 represents the respective relationships between the parameters and MFD. Investing the ranges to be satisfied by the parameters yields the following expressions (69) to (73):

$$4.42[\mu m] \leq a \leq 5.29[\mu m] \quad (69)$$

$$0.569 \leq Ra \leq 0.811 \quad (70)$$

$$Rb \leq 0.899 \quad (71)$$

$$0.295[\%] \leq \Delta 1 \leq 0.521[\%] \quad (72)$$

$$\Delta 3 \leq -0.173[\%] \quad (73)$$

Figure 13:
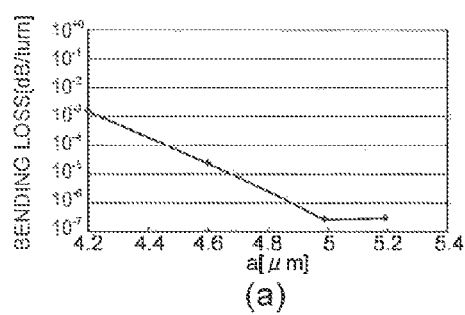
FIG. 13 is a set of charts showing relationships between structural parameters and bending loss in the multicore optical fibers according to the first and second embodiments.
Figure 13:
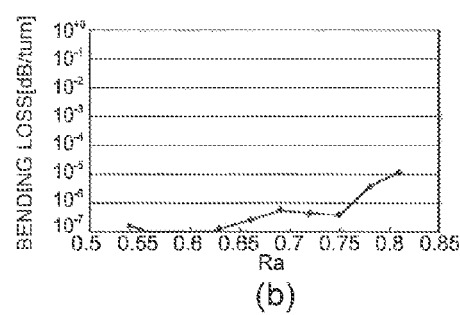
Figure 13:
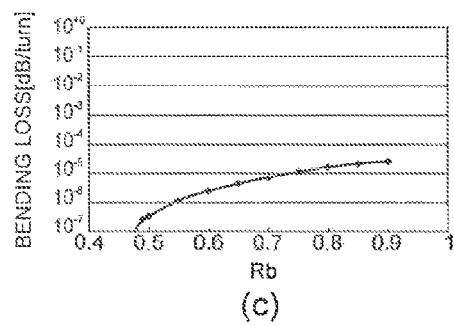
Figure 13:
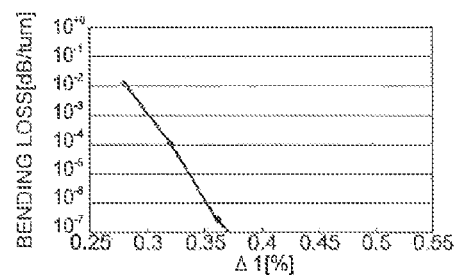
Figure 13:
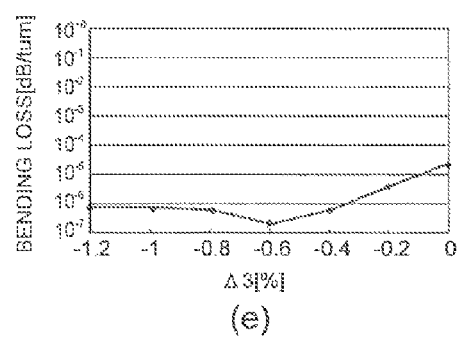
Figure 13:
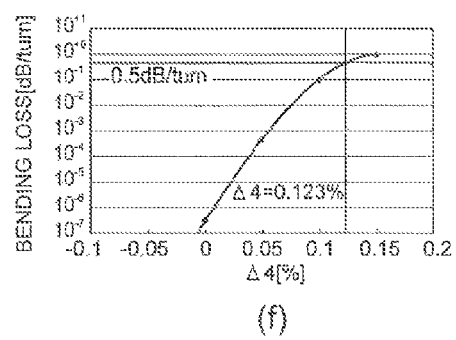

Here, Δ4 does not affect MFD as long as it is at least within the range from −0.05% to +0.15%. Also, since the standard requires the bending loss at a wavelength of 1625 nm at a radius of curvature of 30 mm to be 0.5 dB or less per turn, respective relationships between the parameters and bending loss are determined. FIG. 13 represents the results. They seem to include a non-negligible level of calculation errors at $10^{-6}$ dB/turn or less. Within the ranges of the above-mentioned expressions (63) to (73), Δ4 is required to satisfy the relationship of the following expression (74):

$$\Delta 4 \leq 0.129[\%] \quad (74)$$

When the results represented by the above-mentioned expressions (63) to (74) are put together, ranges to be satisfied by the parameters in the trench type core portions in the multicore optical fiber are the following expressions (75) to (80):

$$4.42[\mu m] \leq a \leq 5.15[\mu m] \quad (75)$$

$$0.627 \leq Ra \leq 0.811 \quad (76)$$

$$0.470 \leq Rb \leq 0.899 \quad (77)$$

$$0.295[\%] \leq \Delta 1 \leq 0.395[\%] \quad (78)$$

$$-0.529[\%] \leq \Delta 3 \leq -0.173[\%] \quad (79)$$

$$-0.029[\%] \leq \Delta 4 \leq 0.123[\%] \quad (80)$$

Figure 14:
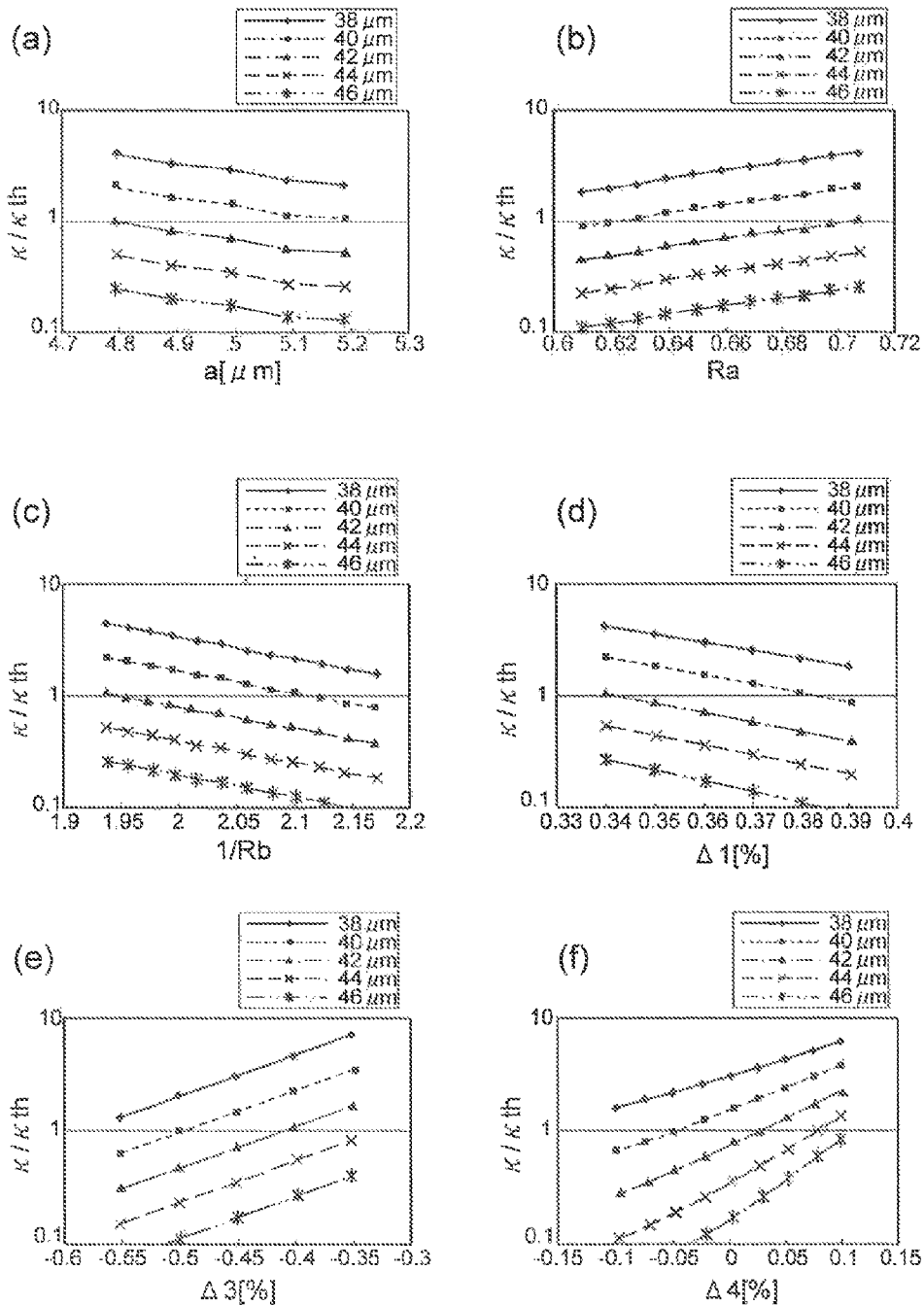
FIG. 14 is a set of charts showing relationships among structural parameters, core pitch, and $\kappa/\kappa_{th}$ in the multicore optical fibers according to the embodiments.

FIG. 14 shows the relationships among the parameters, core pitch Λ, and $\kappa/\kappa_{th}$. As approximate expressions determined for these relationships, conditions to be satisfied by the parameters in order that $\kappa/\kappa_{th} \leq 1$ are represented by the following expressions (81) to (86). The unit for Λ in the following expressions (81) to (86) is μm.

$$a \geq 1.314 \cdot 10^1 - 1.922 \cdot 10^{-1} \Lambda [\mu m] \quad (81)$$

$$Ra \leq 4.062 \cdot 10^{-2} \Lambda - 1.007 \quad (82)$$

$$Rb \leq \frac{1}{5.254 - 7.847 \cdot 10^{-2} \Lambda} \quad (83)$$

$$\Delta 1 \geq 1.099 - 1.799 \cdot 10^{-2} \Lambda [\%] \quad (84)$$

$$\Delta 3 \leq 4.350 \cdot 10^{-2} \Lambda - 2.236[\%] \quad (85)$$

-continued $$\Delta 4 \leq \frac{\sqrt{4.928 \Lambda^2 - 2.108 \cdot 10^2 \Lambda + 3.808 \cdot 10^3} - 0.9439 \Lambda + 2.937 \cdot 10^1}{1.440 \Lambda - 50.74}[\%] \quad (86)$$

From the above-mentioned expressions (81) to (86), it is seen that the condition to be satisfied by the core pitch Λ is Λ ≥ 40.2 [μm].

The 7-core fiber satisfying the above-mentioned (81) to (86) with the core pitch Λ ≥ 40.2 [μm] is in a single mode within the wavelength range from 1530 nm to 1625 nm and can achieve characteristics of crosstalk after transmission over 100 km of −30 dB or less at a probability of 99.99% or higher, MFD of 9.5 μm or more but 10.5 μm or less at 1550 nm, and a bending loss of 0.5 dB/turn or less at 1625 nm. That is, a 7-core fiber having characteristics suitable for transmission within the wavelength range from 1530 nm to 1625 nm can be achieved.

Second Embodiment

The second embodiment of the multicore optical fiber according to the present invention will now be explained as with the above-mentioned first embodiment. The two values represented by the following expression (87a) follow a probability distribution of $\sigma^2 = \chi/2$, so that, if no is sufficiently large, the two values in the following expression (87b) are probabilistically independent from each other and distributed as a probability distribution which is a normal distribution having the same dispersion $\sigma^2 = (\chi/2) \times n_{zero}$ in accordance with the central limit theorem. While being inherently an integer, $n_{zero}$ can be rewritten as the following expression (87c) when the above-mentioned expression (39c) holds.

$$\Re\{\sqrt{\chi}\exp(j\phi_{random})\}, \Im\{\sqrt{\chi}\exp(\phi_{random})\} \quad (87a)$$

$$\Re\{A_n(n_{zero})\}, \Im\{A_n(n_{zero})\} \quad (87b)$$

$$n_{zero} = \frac{\gamma_c}{\pi} L_F \quad (87c)$$

In this case, $\sigma^2$ satisfies the following expression (88). Here, $L_F$ is the fiber length.

$$\sigma^2 = \frac{\kappa_{nm}^2}{\beta_n} \frac{R}{D_{nm}} L_F \quad (88)$$

In practice, two polarization modes must be taken into consideration, whereby the value of dispersion in the probability distribution of the above-mentioned expression (87b) in each of the two polarization modes satisfies the following expression (89). The value represented by the following expression (90a) is distributed in accordance with expression (90b) which is a chi-squared distribution with 4 degrees of freedom, while its cumulative distribution function becomes expression (90c), and the average value $XT_\mu$ of the distribution of $|A_n(n_{zero})|^2$ becomes the following expression (90d):

$$\sigma^2 = \frac{1}{2} \frac{\kappa_{nm}^2}{\beta_n} \frac{R}{D_{nm}} L_F \quad (89)$$

-continued $$\frac{|A_n(n_{zero})|^2}{\sigma^2} \quad (90a)$$

$$f(x) = \frac{1}{4}x\exp\left(-\frac{x}{2}\right) \quad (90b)$$

$$F(x) = 1 - \left(1 + \frac{x}{2}\right)\exp\left(-\frac{x}{2}\right) \quad (90c)$$

$$XT_\mu = 4\sigma^2 = 2\frac{\kappa^2}{\beta}\frac{R}{D_{nm}}L_F \quad (90d)$$

In order for the average value $XT_\mu$ of the distribution of crosstalk to become the permissible value $XT_\mu$ or less, the relationships of the following expressions (91b) to (91d) are obtained from the relationship of the following expression (91a):

$$XT_\mu = 2\frac{\kappa^2}{\beta}\frac{R}{D_{nm}}L_F \le XT_S \quad (91a)$$

$$\kappa \le \sqrt{\frac{1}{2}\beta\frac{D_{nm}}{R}\frac{XT_S}{L_F}} = \kappa_{th} \quad (91b)$$

$$D_{nm} \ge 2\frac{\kappa^2}{\beta}R\frac{L_F}{XT_S} = D_{nm-th} \quad (91c)$$

$$R \le \frac{1}{2}\frac{\beta}{\kappa^2}D_{nm}\frac{XT_S}{L_F} = R_{th} \quad (91d)$$

When $XT_S$ and $L_F$ are provided here, relational expressions to be satisfied by the parameters become clear. When a multicore optical fiber provided with a plurality of cores having the same structure is designed such as to have a core-to-core distance of $D_{nm-th}$ or greater with a coupling coefficient of $\kappa_{nm-th}$ or less and bent at a radius of $R_{th}$ or less, the crosstalk can be suppressed to $XT_S$ or less.

An optical fiber (hereinafter referred to as "7-core optical fiber") having seven cores #1 to #7 as shown in FIG. 9 will now be considered in the second embodiment as in the above-mentioned first embodiment. Since the coupling coefficient between cores decreases exponentially as the core interval increases, it can be assumed that only adjacent cores should be taken into consideration for crosstalk. In this case, the core 1 having the largest number of adjacent cores is influenced by crosstalk from the six cores disposed thereabout. Here, letting $\Lambda$ be the core pitch, the above-mentioned expressions (91a) to (91d) can be rewritten as the following expressions (92a) to (92d), respectively. Even when seven or more cores are arranged into a hexagonal lattice, the expressions to be taken into consideration are the following expressions (92a) to (92d):

$$XT_\mu = 6 \cdot 2\frac{\kappa^2}{\beta}\frac{R}{\Lambda}L_F \le XT_S \quad (92a)$$

$$\kappa \le \sqrt{\frac{1}{12}\beta\frac{\Lambda}{R}\frac{XT_S}{L_F}} = \kappa_{th} \quad (92b)$$

$$\Lambda \ge 12\frac{\kappa^2}{\beta}R\frac{L_F}{XT_S} = \Lambda_{th} \quad (92c)$$

$$R \le \frac{1}{12}\frac{\beta}{\kappa^2}\Lambda\frac{XT_S}{L_F} = R_{th} \quad (92d)$$

For example, letting $\Lambda=40$ [μm], $R=200$ [mm], $\beta=(2\pi/\lambda)\cdot n_{eff}$, $L_F=100$ [km], $XT_S=0.001$, $\lambda=1625$ [nm], and $n_{eff}=1.444$ here, $\kappa \le 9.65\times10^{-4}$, which shows it necessary to have very small $\kappa$. As $\Lambda$ is made greater, $\kappa_{th}$ increases, while the value of $\kappa$ itself decreases exponentially. Even when $\Lambda$ is about 40 μm, $\kappa$ must be made very small as mentioned above. For achieving this, a single-mode optical fiber with a step index type core must have large core $\Delta$ with small MFD.

When a multicore fiber is used for increasing the transmission capacity per fiber, it will be more preferred if the effective area $A_{eff}$ or MFD is greater. However, increasing $A_{eff}$ or MFD while keeping transmission in a single mode also enhances $\kappa$. It is therefore desirable for the multicore optical fiber according to the present invention to employ a trench type core, so as to enhance $A_{eff}$ or MFD and lower $\kappa$ at the same time.

Searching for a structure having at least cable cutoff wavelength λcc and mode field diameter (MFD) conforming to ITU-T G.654.A finds out that a trench type optical fiber shown in FIG. 10 is one of desirable structures. That is, each of the core portions #1 to #7 comprises a first core portion 111, a second core portion 112, and a trench layer 113, each of which is covered with a cladding region 120. The first core portion 111 has a refractive index higher than that of the cladding region 120. The second core portion 112 is disposed about the first core portion 111 and has a refractive index different from that of the first core portion 111. The trench layer 113 is disposed so as to surround the second core portion 112 and has a refractive index lower than that of the cladding region 120. Letting a be the radius of the first core portion 111, Ra be the ratio of the outer diameter of the first core portion 111 to the outer diameter of the second core portion 112, Rb be the ratio of the outer diameter of the second core portion 112 to the outer diameter of the trench layer 113, Δ1 be the relative refractive index difference of the first core portion 111 with respect to the second core portion 112, Δ3 be the relative refractive index difference of the trench layer 113 with respect to the second core portion 112, and Δ4 be the relative refractive index difference of the cladding region 120 with respect to the second core portion 112, one of desirable structures is found to satisfy a=4.99 [μm], Ra=0.66, Rb=0.491, Δ1=0.36[%], Δ3=0.45[%], and Δ4=0.0[%]. Here, the refractive index of silica glass in the second core portion 112 does not always satisfy Δ=0% even when a reference is taken such that Δ2=0[%].

When investigating ranges to be satisfied by the parameters in the vicinity of the above-mentioned structure while keeping the restriction on the standard of G654.A that λcc≤1530 nm, the following expressions (93) to (98) are obtained from FIG. 11.

$$a \le 5.15 [\mu m] \quad (93)$$

$$Ra \ge 0.627 \quad (94)$$

$$Rb \ge 0.470 \quad (95)$$

$$\Delta 1 \le 0.395[\%] \quad (96)$$

$$\Delta 3 \ge -0.529[\%] \quad (97)$$

$$\Delta 4 \ge -0.029[\%] \quad (98)$$

Figure 15:
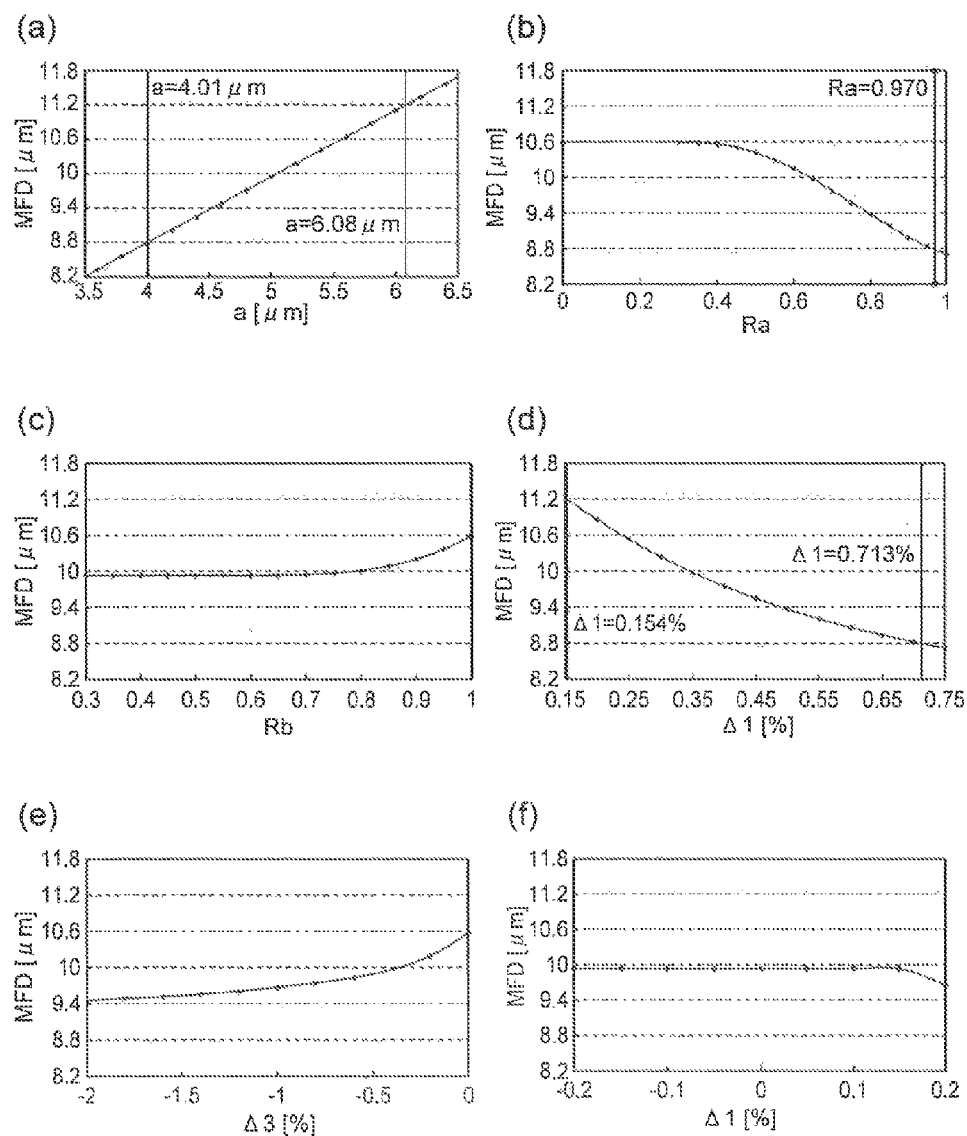
FIG. 15 is a set of charts showing relationships between structural parameters and mode field diameter (MFD) in the multicore optical fiber according to the second embodiment.

Since the standard requires the average value of mode field diameter (MFD) at a wavelength of 1550 nm to fall within the range of 8.8 to 11.2 μm, FIG. 15 represents the respective relationships between the parameters and MFD. Investing the ranges to be satisfied by the parameters yields the following expressions (99) to (101):

$$4.01[\mu m] \leq a \leq 6.08[\mu m] \quad (99)$$

$$Ra \leq 0.970 \quad (100)$$

$$0.154[\%] \leq \Delta 1 \leq 0.713[\%] \quad (101)$$

Here, Rb, Δ3, and Δ4 do not affect MFD as long as they are at least within the respective ranges from 0.3 to 1, from −2.0% to 0.0%, and from −0.20% to +0.20%. Also, since the standard requires the bending loss at a wavelength of 1625 nm at a radius of curvature of 30 mm to be 0.5 dB or less per turn, respective relationships between the parameters and bending loss are determined. The results are the same as with the above-mentioned first embodiment (FIG. 13). They seem to include a non-negligible level of calculation errors at $10^{-6}$ dB/turn or less. Within the ranges of the above-mentioned expressions (93) to (101), Δ4 is required to satisfy the relationship of the following expression (102):

$$\Delta 4 \leq 0.123[\%] \quad (102)$$

When the results represented by the above-mentioned expressions (93) to (101) are put together, ranges to be satisfied by the parameters in the trench type core portions in the multicore optical fiber are the following expressions (103) to (108):

$$4.01[\mu m] \leq a \leq 5.15[\mu m] \quad (103)$$

$$0.627 \leq Ra \leq 0.970 \quad (104)$$

$$0.470 \leq Rb \quad (105)$$

$$0.154[\%] \leq \Delta 1 \leq 0.395[\%] \quad (106)$$

$$-0.529[\%] \leq \Delta 3 \leq 0.0[\%] \quad (107)$$

$$-0.029[\%] \leq \Delta 4 \leq 0.123[\%] \quad (108)$$

In a 7-core fiber such as the one in FIG. 9, the average value of distribution of crosstalk to the center core can be represented as in the following expression (109):

$$XT_\mu = 6 \cdot 2 \frac{\kappa^2}{\beta} \frac{R}{\Lambda} L_F = XT_{coeff}(\Lambda) \cdot R \cdot L_F \quad (109)$$

Figure 16:
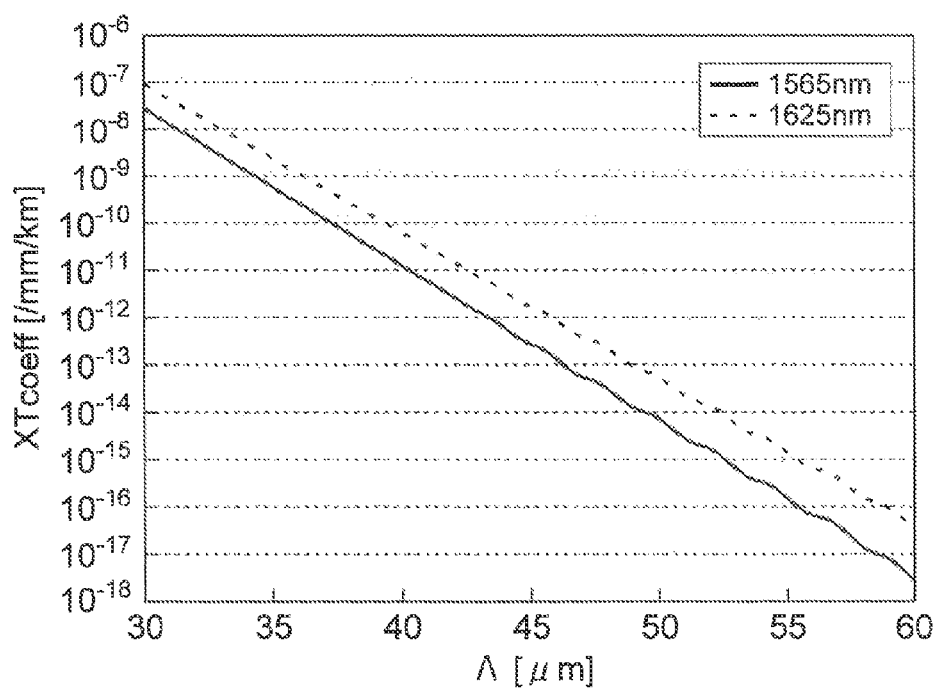
FIG. 16 is a chart showing relationships between the core pitch Λ and crosstalk coefficient $XT_{coef}$ in the multicore optical fiber according to the second embodiment when its radius of curvature R and fiber length $L_F$ are expressed in the units of mm and km, respectively.

In the case of the 7-core fiber having a trench type core satisfying the above-mentioned expressions (103) to (108), crosstalk becomes smaller when a=4.99 [μm], Ra=0.66, Rb=0.491, Δ1=0.36[%], Δ3=−0.529[%], and Δ4=0.0[%]. FIG. 16 is a chart plotting the respective relationships between Λ and $XT_{coeff}$ at wavelengths of 1565 nm and 1625 nm while expressing R and $L_F$ in the units of mm and km, respectively. When Λ is expressed in the unit of μm, $XT_{coeff}$ can be approximated by the following expressions (110a) and (110b) at wavelengths of 1565 nm and 1625 nm, respectively.

$$XT_{coeff}(\Lambda) = \exp(-0.7655\Lambda + 5.5498) \quad (110a)$$

$$XT_{coeff}(\Lambda) = \exp(-0.7229\Lambda + 5.4554) \quad (110b)$$

From the above-mentioned expressions (92a), (109), (110a), and (110b), conditions to be satisfied by Λ are the following expressions (111a) and (111b) at wavelengths of 1565 nm and 1625 nm, respectively.

$$\Lambda \geq \frac{\ln\left(\frac{R \cdot L_F}{XT_S}\right) + 5.5498}{0.7655} \quad (111a)$$

$$\Lambda \geq \frac{\ln\left(\frac{R \cdot L_F}{XT_S}\right) + 5.4554}{0.7229} \quad (111b)$$

Figure 17:
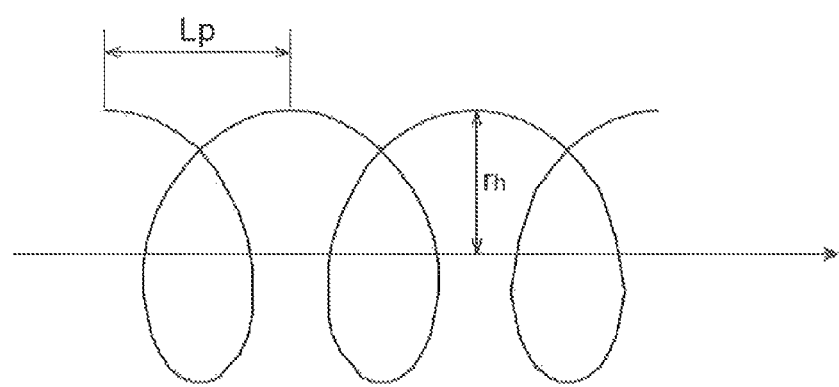
FIG. 17 is a chart for explaining the relationship between the radius $r_h$ and helical pitch $L_P$ of a helix.

Here, as the radius of curvature R of the fiber is smaller, the core pitch Λ can be made smaller, whereby the core density per unit area of a fiber cross section can be enhanced. The fiber is typically used in a cable state. Therefore, when accommodated within a cable at a fixed distance from the cable center on a cable cross section while changing the direction from the cable center as it travels longitudinally of the cable, the fiber can keep a substantially constant radius of curvature by becoming a helix even if the cable is in a linear state. In this case, helically accommodating the fiber within the cable increases the fiber length with respect to the cable length. Hence, letting $r_h$ and $L_P$ be the radius and pitch of a helix, respectively, as shown in FIG. 17, the radius of curvature R of the helix is represented by the following expression (112):

$$R = \frac{r_h^2 + \left(\frac{L_P}{2\pi}\right)^2}{r_h} \quad (112)$$

The increase ratio $L_D$ of the fiber length with respect to the cable length is represented by the following expression (113). Therefore, the relationship between $L_D$ and R is represented by the following expression (114):

$$L_D = \left[\left(r_h \frac{2\pi}{L_P}\right)^2 + 1\right]^{\frac{1}{2}} - 1 \quad (113)$$

$$L_D = \left(\frac{R}{R - r_h}\right)^{\frac{1}{2}} - 1 \quad (114)$$

Hence, letting $L_{span}$ [km] be the span length, and $\alpha_{km}$ [km] be the attenuation coefficient per 1 km, the loss increase $\alpha_D$ per span caused by $L_D$ is represented by the following expression (115):

$$\alpha_D = \left[\left(\frac{R}{R - r_h}\right)^{\frac{1}{2}} - 1\right] \cdot \alpha_{km} L_{span} \quad (115)$$

Figure 18:
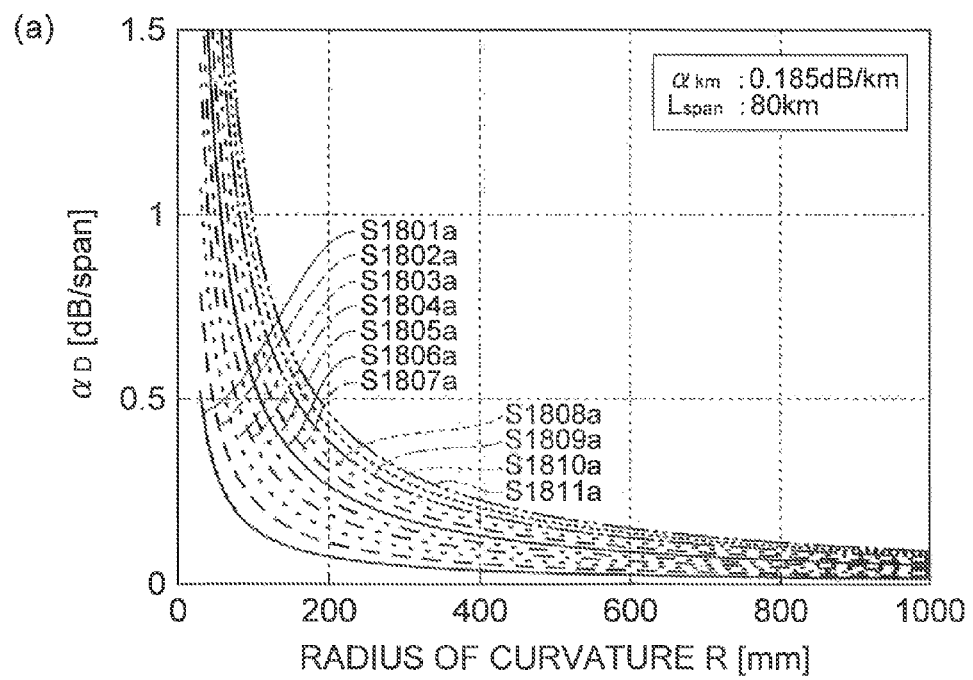
FIG. 18 is a set of charts showing relationships between the radius of curvature R and loss increase $\alpha_D$.
Figure 18:
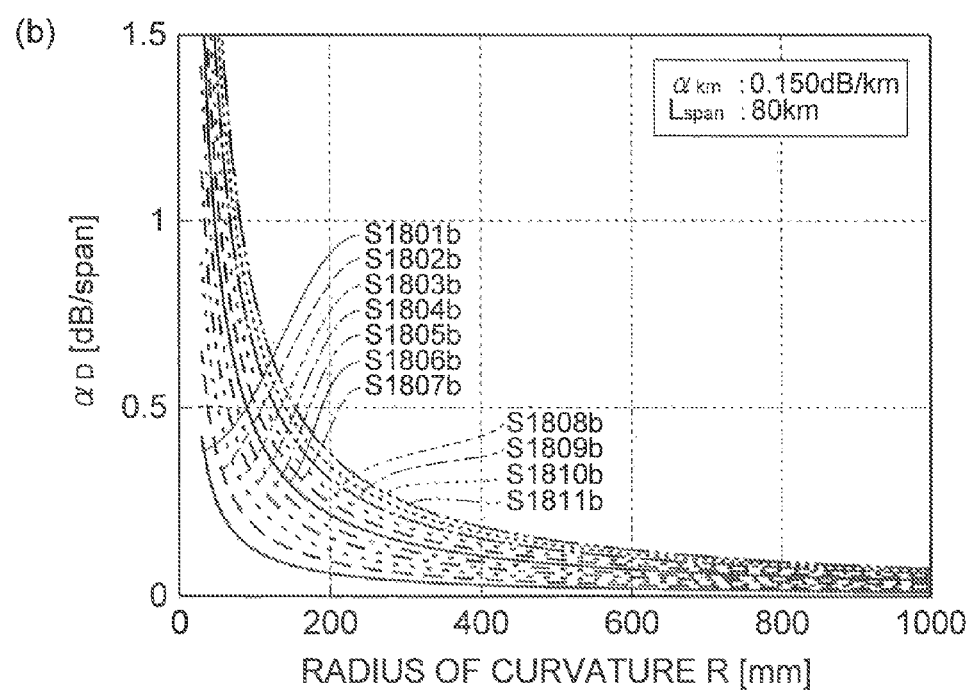

FIG. 18(*a*) shows $\alpha_D$ when using $L_{span}$ of 80 km as a typical span length and a of 0.185 dB/km as the attenuation coefficient, while 18(*b*) shows au when changing $\alpha_{km}$ to 0.150 dB/km but keeping $L_{span}$ at 80 km.

In FIG. 18(*a*), graphs G1801*a*, G1802*a*, G1803*a*, G1804*a*, G1805*a*, G1806*a*, G1807*a*, G1808*a*, G1809*a*, G1810*a*, and G1811*a* represent relationships between an and R when the helical radius is set to 2 mm, 3 mm, 4 mm, 5 mm, 6 mm, 7 mm, 8 mm, 9 mm, 10 mm, 11 mm, and 12 mm, respectively.

In FIG. 18(*b*), graphs G1801*b*, G1802*b*, G1803*b*, G1804*b*, G1805*b*, G1806*b*, G1807*b*, G1808*b*, G1809*b*, G1810*b*, and G1811b represent relationships between $\alpha_D$ and R when the helical radius is set to 2 mm, 3 mm, 4 mm, 5 mm, 6 mm, 7 mm, 8 mm, 9 mm, 10 mm, 11 mm, and 12 mm, respectively.

From FIGS. 18(*a*) and 18(*b*), it is seen that $\alpha_D$ becomes greater as $r_h$ increases when R is constant. Since the distance from the cable center to a fiber on a cable cross section is 12 mm at a maximum in cables which are currently in use in general, it will be sufficient if $\alpha_D$ is considered in the case where $r_h$=12 mm. In view of deterioration in OSNR during transmission, it is desirable for $\alpha_D$ to be the permissible value $\alpha_S$ or less. Hence, from the following expression (116), the condition to be satisfied by R is determined as in expression (117):

$$\alpha_D = \left[\left(\frac{R}{R-r_h}\right)^{\frac{1}{2}} - 1\right] \cdot \alpha_{km} L_{span} \leq \alpha_S \qquad (116)$$

$$R \geq \frac{\left(\frac{\alpha_S}{\alpha_{km} L_{span}} + 1\right)^2}{\left(\frac{\alpha_S}{\alpha_{km} L_{span}} + 1\right)^2 - 1} r_h \qquad (117)$$

Here, $\alpha_S$ is preferably 1.0 dB/span or less at most, more preferably 0.5 dB/span or less, further preferably 0.2 dB/km or less. Therefore, when $L_{span}$ and $\alpha_{km}$ are 80 km and 0.185 dB/km, respectively, R is preferably 97.9 mm or more, more preferably 186.6 mm or more, further preferably 453.0 mm or more. When $L_{span}$ and $\alpha_{km}$ are 80 km and 0.150 dB/km, respectively, R is preferably 81.1 mm or more, more preferably 153.1 mm or more, further preferably 369.0 mm or more.

While taking account of the foregoing, crosstalk at a wavelength of 1565 nm will be studied from the above-mentioned expressions (111a) and (111b) on the premise that the core pitch $\Lambda$ is a distance sufficient for keeping the respective trench layers 113 of cores from coming into contact with each other. In order for the crosstalk distribution after propagation over a fiber length of 100 km to have an average value of 0.001 or less (−30 dB or less) in this case when $L_{span}$ and $\alpha_{km}$ are 80 km and 0.185 dB/km, respectively, the core pitch $\Lambda$ is required to be 28.28 μm or more, more preferably 29.12 μm or more, further preferably 30.28 μm or more. When $L_{span}$ and $\alpha_{km}$ are 80 km and 0.150 dB/km, respectively, the core pitch $\Lambda$ is required to be 28.03 μm or more, more preferably 28.86 μm or more, further preferably 30.01 μm or more.

In order for the crosstalk distribution after propagation over a fiber length of 1000 km to have an average value of 0.001 or less (−30 dB or less) when $L_{span}$ and $\alpha_{km}$ are 80 km and 0.185 dB/km, respectively, the core pitch $\Lambda$ is required to be 31.29 μm or more, more preferably 32.13 μm or more, further preferably 33.29 μm or more. When $L_{span}$ and $\alpha_{km}$ are 80 km and 0.150 dB/km, respectively, the core pitch $\Lambda$ is required to be 31.04 μm or more, more preferably 31.87 μm or more, further preferably 33.02 μm or more.

In order for the crosstalk distribution after propagation over a fiber length of 10000 km to have an average value of 0.001 or less (−30 dB or less) when $L_{span}$ and $\alpha_{km}$ are 80 km and 0.185 dB/km, respectively, the core pitch $\Lambda$ is required to be 34.29 μm or more, more preferably 35.14 μm or more, further preferably 36.30 μm or more. When $L_{span}$ and $\alpha_{km}$ are 80 km and 0.150 dB/km, respectively, the core pitch $\Lambda$ is required to be 34.05 μm or more, more preferably 34.88 μm or more, further preferably 36.03 m or more.

Crosstalk at a wavelength of 1565 nm will now be studied. In order for the crosstalk distribution after propagation over a fiber length of 100 km to have an average value of 0.001 or less (−30 dB or less) in this case when $L_{span}$ and $\alpha_{km}$ are 80 km and 0.185 dB/km, respectively, the core pitch $\Lambda$ is required to be 29.81 μm or more, more preferably 30.71 μm or more, further preferably 31.93 μm or more. When $L_{span}$ and $\alpha_{km}$ are 80 km and 0.150 dB/km, respectively, the core pitch $\Lambda$ is required to be 29.55 μm or more, more preferably 30.43 μm or more, further preferably 31.65 μm or more.

In order for the crosstalk distribution after propagation over a fiber length of 1000 km to have an average value of 0.001 or less (−30 dB or less) when $L_{span}$ and $\alpha_{km}$ are 80 km and 0.185 dB/km, respectively, the core pitch $\Lambda$ is required to be 33.00 μm or more, more preferably 32.13 μm or more, further preferably 35.12 μm or more. When $L_{span}$ and $\alpha_{km}$ are 80 km and 0.150 dB/km, respectively, the core pitch $\Lambda$ is required to be 32.74 μm or more, more preferably 33.62 μm or more, further preferably 34.83 μm or more.

In order for the crosstalk distribution after propagation over a fiber length of 10000 km to have an average value of 0.001 or less (−30 dB or less) when $L_{span}$ and $\alpha_{km}$ are 80 km and 0.185 dB/km, respectively, the core pitch $\Lambda$ is required to be 36.18 μm or more, more preferably 37.08 μm or more, further preferably 38.30 μm or more. When $L_{span}$ and $\alpha_{km}$ are 80 km and 0.150 dB/km, respectively, the core pitch $\Lambda$ is required to be 35.92 μm or more, more preferably 36.80 μm or more, further preferably 38.02 μm or more.

Figure 19:
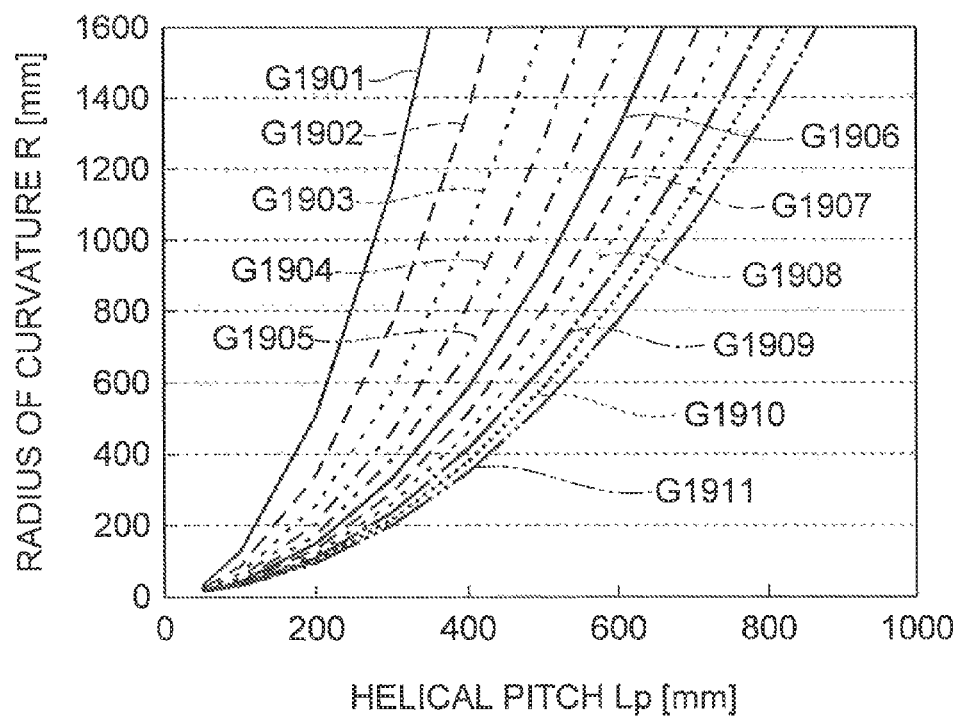
FIG. 19 is a chart showing relationships between the helical pitch $L_P$ and radius of curvature R of the helix.

FIG. 19 shows relationships between the helical pitch $L_P$ and radius of curvature R obtained from the above-mentioned expression (112). In FIG. 19, graphs G1901, G1902, G1903, G1904, G1905, G1906, G1907, G1908, G1909, G1910, and G1911 represent relationships between $L_P$ and R when the helical radius is set to 2 mm, 3 mm, 4 mm, 5 mm, 6 mm, 7 mm, 8 mm, 9 mm, 10 mm, 11 mm, and 12 mm, respectively.

In a thin cable, the distance from the cable center to a fiber on a cable cross section may be as short as about 2 mm. In view of the productivity of cables, the helical pitch $L_P$ at the time of helically accommodating a fiber within a cable is preferably 200 mm or more, more preferably 300 mm or more. In view of these, the radius of curvature R of the fiber is preferably 508.6 mm or more, more preferably 1141.86 mm or more.

While taking account of the foregoing, crosstalk at a wavelength of 1565 nm will be studied from the above-mentioned expressions (111a) and (111b) on the premise that the core pitch $\Lambda$ is a distance sufficient for keeping the respective trench layers 113 of cores from coming into contact with each other. In order for the crosstalk distribution after propagation over a fiber length of 100 km to have an average value of 0.001 or less (−30 dB or less) in this case, the core pitch $\Lambda$ is preferably 30.43 μm or more, more preferably 31.49 μm or more. In order for the crosstalk distribution after propagation over a fiber length of 1000 km to have an average value of 0.001 or less (−30 dB or less), the core pitch $\Lambda$ is preferably 33.44 μm or more, more preferably 34.50 μm or more. In order for the crosstalk distribution after propagation over a fiber length of 10000 km to have an average value of 0.001 or less (−30 dB or less), the core pitch $\Lambda$ is preferably 36.45 μm or more, more preferably 37.50 μm or more.

Crosstalk at a wavelength of 1625 nm will now be studied. In order for the crosstalk distribution after propagation over a fiber length of 100 km to have an average value of 0.001 or less (−30 dB or less) in this case, the core pitch $\Lambda$ is preferably 32.09 μm or more, more preferably 33.21 μm or more. In order for the crosstalk distribution after propagation over a fiber length of 1000 km to have an average value of 0.001 or less (−30 dB or less), the core pitch $\Lambda$ is preferably 35.28 μm or more, more preferably 36.40 μm or more. In order for the crosstalk distribution after propagation over a fiber length of 10000 km to have an average value of 0.001 or less (−30 dB or less), the core pitch Λ is preferably 38.46 μm or more, more preferably 39.58 μm or more.

The invention claimed is:

1. A multicore optical fiber which comprises: a plurality of cores extending along a predetermined axis while being arranged like a hexagonal lattice on a cross section perpendicular to the axis; and a cladding region surrounding each of the plurality of cores, all of core portions, each constituting at least a part of the associated one of the plurality of cores, having substantially the same structure;

wherein, letting

κ be the mode-coupling coefficient between cores,

β be the propagation constant of each of the plurality of cores,

Λ be the core pitch, $R_{th}$ be the radius of curvature of the fiber, $L_F$ be the fiber length, $XT_\mu$ be the average value of a crosstalk distribution after propagation over the fiber length $L_F$, $XT_s$ be the maximum permissible $XT_\mu$, $\Lambda_{th}$ be the minimum permissible Λ, and $R_{th}$ be the maximum permissible R, the multicore optical fiber satisfies any of the following expressions (1) to (3), whereby $XT_\mu$ is $XT_s$ or less:

$$6.2 \frac{\kappa^2}{\beta} \frac{R}{\Lambda} L_F \leq XT_S \quad (1)$$

$$\Lambda \geq 12 \frac{\kappa^2}{\beta} R \frac{L_F}{XT_S} = \Lambda_{th} \quad (2)$$

$$R \leq \frac{1}{12} \frac{\beta}{\kappa^2} \Lambda \frac{XT_S}{L_F} = R_{th}. \quad (3)$$

2. The multicore optical fiber according to claim 1, wherein each of the core portions has, as optical characteristics thereof, a cable cutoff wavelength λcc of 1530 nm or less, and a bending loss of 0.5 dB or less at a wavelength of 1625 nm per turn at a radius of curvature of 30 mm;

wherein each of the core portions comprises a first core portion having a refractive index higher than that of the cladding region; a second core portion, disposed about the first core portion, having a refractive index different from that of the first core portion; and a trench layer, disposed so as to surround the second core portion, having a refractive index lower than that of the cladding region.

3. The multicore optical fiber according to claim 2, wherein each of the core portions has, as optical characteristics thereof, a mode field diameter of 8.8 to 11.2 μm at a wavelength of 1550 nm.

4. The multicore optical fiber according to claim 1, wherein, letting a be the radius of the first core portion, Ra be the ratio of the outer diameter of the first core portion to the outer diameter of the second core portion, Rb be the ratio of the outer diameter of the second core portion to the outer diameter of the trench layer, Δ1 be the relative refractive index difference of the first core portion with respect to the second core portion, Δ3 be the relative refractive index difference of the trench layer with respect to the second core portion, and Δ4 be the relative refractive index difference of the cladding region with respect to the second core portion, the multicore optical fiber satisfies the following expressions (4) to (9):

$$4.01[\mu m] \leq a \leq 5.15[\mu m] \quad (4)$$

$$0.627 \leq Ra \leq 0.970 \quad (5)$$

$$0.470 \leq Rb \quad (6)$$

$$0.154[\%] \leq \Delta 1 \leq 0.395[\%] \quad (7)$$

$$-0.529[\%] \leq \Delta 3 \leq 0.0[\%] \quad (8)$$

$$-0.029[\%] \leq \Delta 4 \leq 0.123[\%] \quad (9).$$

5. The multicore optical fiber according to claim 1, wherein $R_{th}$ is 81.1 mm or more.

6. The multicore optical fiber according to claim 1, wherein $R_{th}$ is 508.6 mm or more.

7. The multicore optical fiber according to claim 1, wherein $XT_S$ is 0.001 or less, and $L_F$ is 100 km or more.

8. The multicore optical fiber according to claim 4, wherein the core pitch Λ is 28.03 μm or more, while the respective trench layers of the cores are kept from coming into contact with each other.

* * * * *